(12) United States Patent
Saika

(10) Patent No.: US 8,645,737 B2
(45) Date of Patent: Feb. 4, 2014

(54) POWER-SAVING CONTROL APPARATUS AND METHOD

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 705 days.

(21) Appl. No.: 12/504,466

(22) Filed: Jul. 16, 2009

(65) Prior Publication Data

US 2010/0299547 A1    Nov. 25, 2010

(30) Foreign Application Priority Data

May 21, 2009    (JP) ................................ 2009-122943

(51) Int. Cl.
*G06F 1/32*    (2006.01)

(52) U.S. Cl.
USPC ........................................................ 713/324

(58) Field of Classification Search
USPC ........................................................ 713/324
See application file for complete search history.

(56) References Cited

U.S. PATENT DOCUMENTS

| | | | |
|---|---|---|---|
| 7,330,950 B2 * | 2/2008 | Matsunami et al. | 711/165 |
| 7,533,230 B2 * | 5/2009 | Glover et al. | 711/165 |
| 7,669,026 B2 * | 2/2010 | Boss et al. | 711/165 |
| 7,873,867 B2 * | 1/2011 | Ikawa et al. | 713/320 |
| 8,006,111 B1 * | 8/2011 | Faibish et al. | 713/324 |
| 2008/0126702 A1 | 5/2008 | Zimoto et al. | |
| 2008/0229131 A1 | 9/2008 | Kono et al. | |

FOREIGN PATENT DOCUMENTS

| | | |
|---|---|---|
| JP | 2008-134829 | 6/2008 |
| JP | 2008-225772 | 9/2008 |

* cited by examiner

*Primary Examiner* — Kim Huynh
*Assistant Examiner* — Eric Chang
(74) *Attorney, Agent, or Firm* — Foley & Lardner LLP

(57) ABSTRACT

A power-saving control apparatus and method capable of power-saving and prevention of decrease in the speed of accessing files of a high level of importance is suggested.

First file migration processing is executed for detecting a user access pattern for each file stored in a storage apparatus, grouping files of similar access patterns based on the detected access patterns, migrating each of the grouped files, by group, to memory media individually capable of power-saving control, and setting a power-saving control schedule for each group based on the access pattern for each file; and power-saving control of each memory medium is executed in accordance with the schedule set for each group; wherein the power-saving control schedule for each group is set based on the access pattern of the file whose level of importance is set to the highest level, from among the files belonging to that group.

14 Claims, 39 Drawing Sheets

FIG.4

| DIRECTORY PATH NAME | I-NODE NUMBER |
|---|---|
| /home/user-01/···/a.txt | 100 |
| /home/user-02/···/b.txt | 200 |
| : | : |

71A  71B  71

<NOTES>
Abbreviations: u→user, g→group, o→others (other than "user")
Abbreviations: r→read, x→execute, w→write

FIG.8

| DIRECTORY PATH NAME | HOST NAME | FILE SYSTEM NAME | I-NODE NUMBER |
|---|---|---|---|
| /b.txt | NAS-1 | FS11 | 200 |
| /Holder-1/d.txt | NAS-2 | FS21 | 501 |
| /Holder-2/a.txt | NAS-3 | FS31 | 1000 |
| /Holder-1/Holder-11/c.txt | NAS-3 | FS32 | 1001 |

| DIRECTORY PATH NAME | IMPORTANCE LEVEL | ACCESS TIME ZONE | | | | | | |
|---|---|---|---|---|---|---|---|---|
| | | T1~T2 | T2~T3 | T3~T4 | T4~T5 | T5~T6 | T6~T7 | T7~T8 |
| /File-1.txt | B | ▓ | | | | | | |
| /File-2.txt | A | | ▓ | | | | | |
| /Holder-1/File-3.txt | B | | | ▓ | | | | ▓ |
| /Holder-1/File-4.txt | C | | | | | | | |
| /Holder-2/File-5.txt | A | | | ▓ | ▓ | ▓ | ▓ | |
| /Holder-2/File-6.tx | B | | | | | | ▓ | |
| /Holder-1/Holder-11/File-7.txt | C | ▓ | | | | | | |
| /Holder-1/Holder-11/File-8.txt | A | | | | ▓ | | | ▓ |
| /Holder-1/Holder-11/File-9.txt | A | | | | | ▓ | | |

FIG.11

| FILE NAME | IMPORTANCE LEVEL | ACCESS TIME ZONE ||||||||
|---|---|---|---|---|---|---|---|---|
| | | T1~T2 | T2~T3 | T3~T4 | T4~T5 | T5~T6 | T6~T7 | T7~T8 |
| /File-2.txt | A | | ▓ | ▓ | | | | |
| /Holder-2/File-6.txt | B | ▓ | ▓ | | | | | |
| : | : | : | : | : | : | : | : | : |

| FILE GROUP NAME | RAID GROUP NAME | POWER-SAVING TIME ZONE ||||||||
|---|---|---|---|---|---|---|---|---|
| | | T1~T2 | T2~T3 | T3~T4 | T4~T5 | T5~T6 | T6~T7 | T7~T8 |
| FileGroup-1 | RG-1 | | ▓ | ▓ | | | | |
| FileGroup-2 | RG-2 | | | | | ▓ | ▓ | |
| FileGroup-3 | RG-3 | ▓ | | | | | | ▓ |

FIG.14

| ACCESSED FILE | ACCESS USER | ACCESS DATE AND TIME |
|---|---|---|
| /File-1.txt | user001 | 2008/11/14 10:00:11~2008/11/14 10:12:03 |
| /File-2.txt | user002 | 2008/11/14 11:01:58~2008/11/14 11:02:31 |
| : | : | : |
| : | : | : |

FIG.16A

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-1 | B | ▓ |  |  |  | ▓ | ▓ |  |
| File-2 | A |  | ▓ | ▓ |  |  |  |  |
| File-3 | B |  |  |  |  |  |  | ▓ |
| File-4 | C |  |  |  |  |  |  |  |
| File-5 | A |  |  |  | ▓ | ▓ |  |  |
| File-6 | B |  | ▓ | ▓ |  |  |  |  |
| File-7 | C |  |  |  |  |  |  |  |
| File-8 | A | ▓ |  |  |  |  |  | ▓ |
| File-9 | A |  |  |  | ▓ | ▓ |  |  |

FileGroup-1    CAPABLE OF SPIN-DOWN    CAPABLE OF SPIN-DOWN

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-2 | A |  | ▓ | ▓ |  |  |  |  |

FIG.16C

FileGroup-2    CAPABLE OF SPIN-DOWN    CAPABLE OF SPIN-DOWN

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-5 | A |  |  |  | ▓ | ▓ |  |  |
| File-9 | A |  |  |  | ▓ | ▓ |  |  |

FIG.16D

FileGroup-3    CAPABLE OF SPIN-DOWN

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-8 | A | ▓ |  |  |  |  |  | ▓ |

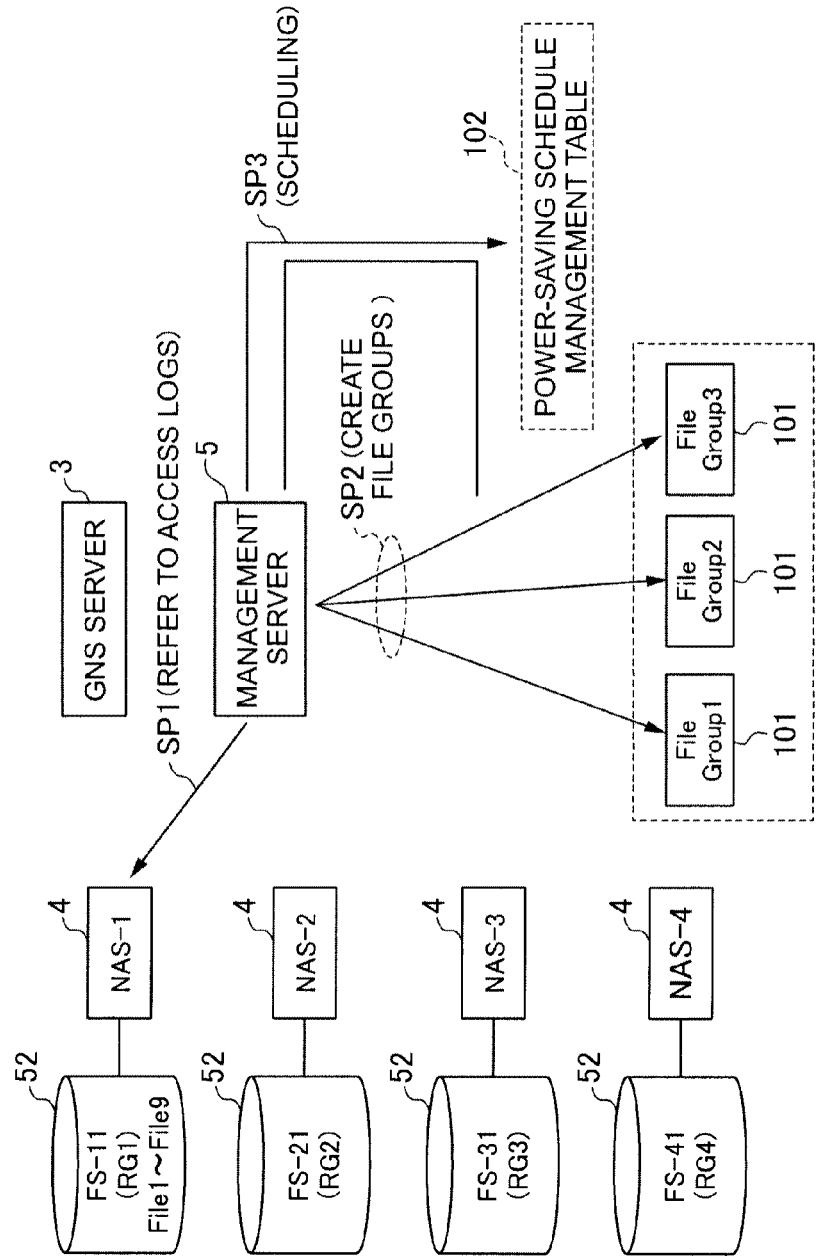

FIG.18

| FILE GROUP NAME | RAID GROUP NAME | T1~T2 | T2~T3 | T3~T4 | T4~T5 | T5~T6 | T6~T7 | T7~T8 |
|---|---|---|---|---|---|---|---|---|
| FileGroup-1 | RG-1 | | ▓ | | | | | |
| FileGroup-2 | RG-2 | | | | ▓ | ▓ | ▓ | |
| FileGroup-3 | RG-3 | ▓ | | | | | | ▓ |

102

SP4(IMPORTANCE LEVEL B FILE SORTING)

FIG.20A

FileGroup-1                                                                101

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-2 | A |  |  |  |  |  |  |  |
| File-6 | B | ※ |  |  |  |  |  |  |

FIG.20B

FileGroup-2                                                                101

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-5 | A |  |  |  |  |  |  |  |
| File-9 | A |  |  |  |  |  |  |  |
| File-1 | B | ※ |  |  |  |  |  |  |

FIG.20C

FileGroup-3                                                                101

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-8 | A |  |  |  |  |  |  |  |
| File-3 | B |  |  |  |  |  |  |  |

IMPORTANCE LEVEL

SP5 (IMPORTANCE LEVEL C FILE SORTING)

FIG.22A

FileGroup-1 101

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-2 | A | | ▓ | ▓ | | | | |
| File-6 | B | ※ | ▓ | ▓ | | | | |
| File-4 | C | | | | | | | |

FIG.22B

FileGroup-2(NO ADDITION) 101

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-5 | A | | | | ▓ | ▓ | ▓ | |
| File-9 | A | | | | ▓ | ▓ | | |
| File-1 | B | ※ | | | | ▓ | ▓ | |

FIG.22C

FileGroup-3 101

| FILE NAME | IMPORTANCE LEVEL | T1~T2 | T2~T3 | T3~T4 | T4~T5 | T5~T6 | T6~T7 | T7~T8 |
|---|---|---|---|---|---|---|---|---|
| File-8 | A | ▓ | | | | | | ▓ |
| File-3 | B | | | | | | | ▓ |
| File-7 | C | | | | | | | |

FIG.24A

<BEFORE MIGRATION>                                                84

| DIRECTORY PATH NAME | HOST NAME | FILE SYSTEM NAME | I-NODE NUMBER |
|---|---|---|---|
| /File-1.txt | NAS-1 | FS-11 | 1001 |
| /File-2.txt | NAS-1 | FS-11 | 1002 |
| /Holder-1/File-3.txt | NAS-1 | FS-11 | 1003 |
| /Holder-1/File-4.txt | NAS-1 | FS-11 | 1004 |
| /Holder-2/File-5.txt | NAS-1 | FS-11 | 1005 |
| /Holder-2/File-6.txt | NAS-1 | FS-11 | 1006 |
| /Holder-1/Holder-11/File-7.txt | NAS-1 | FS-11 | 1007 |
| /Holder-1/Holder-11/File-8.txt | NAS-1 | FS-11 | 1008 |
| /Holder-1/Holder-11/File-9.txt | NAS-1 | FS-11 | 1009 |

FIG.24B

<AFTER MIGRATION>                                                 84

| DIRECTORY PATH NAME | HOST NAME | FILE SYSTEM NAME | I-NODE NUMBER |
|---|---|---|---|
| /File-1.txt | NAS-3 | FS-31 | 1001 |
| /File-2.txt | NAS-2 | FS-21 | 1002 |
| /Holder-1/File-3.txt | NAS-4 | FS-41 | 1003 |
| /Holder-1/File-4.txt | NAS-2 | FS-21 | 1004 |
| /Holder-2/File-5.txt | NAS-3 | FS-31 | 1005 |
| /Holder-2/File-6.txt | NAS-2 | FS-21 | 1006 |
| /Holder-1/Holder-11/File-7.txt | NAS-4 | FS-41 | 1007 |
| /Holder-1/Holder-11/File-8.txt | NAS-4 | FS-41 | 1008 |
| /Holder-1/Holder-11/File-9.txt | NAS-3 | FS-31 | 1009 |

FIG.27

```
ACCESS TO FILE A : 01:00-2:00, 06:00-12:00, 19:00-21:00
ACCESS TO FILE B : 03:00-5:00, 13:00-16:00, 18:00-19:00
ACCESS TO FILE C : 00:15-2:20, 05:45-11:15, 18:50-22:15
ACCESS TO FILE D : 04:00-5:20, 13:05-16:10, 18:00-19:00
ACCESS TO FILE E :     -    , 13:20-15:35,     -
```

FIG.28

| FILE \ TIME | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| A | | | | | | | | ▨ | ▨ | ▨ | | ▨ | | | | | | | | | ▨ | | | |
| B | | ▨ | | ▨ | | | ▨ | | | | | | | ▨ | ▨ | | | | ▨ | | | | | |
| C | | | ▨ | | | | ▨ | | | ▨ | | | | ▨ | | | | | | ▨ | | ▨ | | |
| D | | | | | ▨ | | | | | | | | | | ▨ | ▨ | | | ▨ | | | | | |
| E | | | | | | | | | | | | | | | | | | | | | | | | |

FIG.31

| TIME group | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Group1 | | ▨ | | | | | ▨ | ▨ | ▨ | ▨ | ▨ | ▨ | | | | | | | | ▨ | ▨ | ▨ | | |
| Group2 | | | | | ▨ | | | | | | | | | ▨ | | ▨ | | | ▨ | | | | | |

FIG.32

| OBJECT \ TIME | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| A |  | ▨ |  |  |  |  | ▨ |  |  |  |  | ▨ |  |  |  |  |  |  |  |  | ▨ |  |  |  |
| B |  |  |  | ▨ | ▨ |  |  | ▨ | ▨ |  |  |  |  | ▨ | ▨ | ▨ |  |  | ▨ |  |  |  |  |  |
| C |  | ▨ | ▨ |  |  |  |  | ▨ | ▨ |  | ▨ |  |  |  | ▨ | ▨ |  |  |  | ▨ | ▨ | ▨ |  |  |
| D |  |  |  |  | ▨ |  |  | ▨ | ▨ |  |  |  |  |  | ▨ | ▨ |  |  | ▨ |  |  |  |  |  |
| E |  |  |  |  |  |  |  | ▨ | ▨ |  |  |  |  |  | ▨ | ▨ |  |  |  |  |  |  |  |  |
| F | ▨ | ▨ | ▨ |  |  | ▨ | ▨ | ▨ | ▨ | ▨ |  | ▨ | ▨ | ▨ | ▨ | ▨ |  | ▨ |  | ▨ | ▨ | ▨ | ▨ | ▨ |

FIG.33

| FILE SYSTEM NAME | FREE SPACE [MB] |
|---|---|
| FS-21(RG2) | 1000 |
| FS-31(RG3) | 600 |
| FS-41(RG4) | 800 |

FIG.34

| CASE | FREE SPACE [MB] AFTER STORAGE | | | VARIANCE |
|---|---|---|---|---|
| | FS-21 | FS-31 | FS-41 | |
| STORE FILE IN FS-21 | 800 | 600 | 800 | {2*(733.3−800)^2+(733.33−600)^2}/3=8888.89 |
| STORE FILE IN FS-31 | 1000 | 400 | 800 | {(733.3−1000)^2+(733.3−400)^2+(733.3−800)^2}/3=62222.22 |
| STORE FILE IN FS-41 | 1000 | 600 | 600 | {2*(733.33−600)^2+(733.33−1000)^2}/3=35555.56 |

FIG.35

| FILE GROUP NAME | RAID GROUP NAME | T1~T2 | T2~T3 | T3~T4 | T4~T5 | T5~T6 | T6~T7 | T7~T8 |
|---|---|---|---|---|---|---|---|---|
| FileGroup-1 | RG-1 | | | ▓ | | | | |
| FileGroup-2 | RG-2 | | | | | ▓ | ▓ | |
| FileGroup-3 | RG-3 | ▓ | | | | | | ▓ |

US 8,645,737 B2

POWER-SAVING CONTROL APPARATUS AND METHOD

CROSS-REFERENCES TO RELATED APPLICATIONS

This application relates to and claims priority from Japanese Patent Application No. 2009-122943, filed on May 21, 2009, the entire disclosure of which is incorporated herein by reference.

TECHNICAL FIELD

The present invention relates to a power-saving control apparatus and method and is ideal for use in, for example, power-saving control of a computer system.

BACKGROUND ART

Along with scale expansion and performance enhancement of storage apparatuses, power consumption by the storage apparatuses are growing steadily and the demand for power-saving of the storage apparatuses is rising.

Under such circumstances, a power-saving method by controlling power-on or power-off of a storage apparatus (Japanese Patent Laid-open (Kokai) Application Publication No. 2008-225772) and a method for executing power-saving control on a RAID (Redundant Arrays of Independent Disks) group basis (Japanese Patent Laid-open (Kokai) Application Publication No. 2008-134829) have been suggested in recent years.

DISCLOSURE OF THE INVENTION

One of methods for executing power-saving control on a RAID group basis is to execute power-saving control of each of disk units that constitute a RAID group, based on user access patterns for files stored in storage areas provided by that RAID group (hereinafter referred to as "stored in the RAID group").

However, by the above-mentioned power-saving control method, which mode, a power-saving mode or a normal mode, should be selected to operate each of the disk units constituting the RAID group is decided by the majority of the number of files for each time zone based on access patterns for files stored in that RAID group. Therefore, an access pattern for files of a high level of importance can hardly be reflected. As a result, the number of time zones during which files of a high level of importance cannot be promptly accessed increases, which results in a problem of adverse effects on business activities.

The present invention was devised in light of the circumstances described above, and it is an object of the invention to provide a power-saving control apparatus and method capable of power-saving and prevention of decrease in the speed of accessing files of a high level of importance.

In order to achieve the above-described object, a power-saving control apparatus for executing power-saving control of a storage apparatus is provided according to an aspect of the invention, wherein the power-saving control apparatus includes: a first file migration processing unit for executing first file migration processing for obtaining access logs for a plurality of files stored in the storage apparatus, detecting a user access pattern for each of the files based on the obtained access logs, grouping the files of similar access patterns based on the detected access pattern for each of the files, migrating each of the grouped files, by group, to different memory media individually capable of power-saving control, and setting a power-saving control schedule for each group based on the access pattern for each of the files; and a power-saving control processing unit for executing power-saving control of each of the memory media in accordance with the schedule set for each group; wherein the first file migration processing unit sets the power-saving control schedule for each group based on the access pattern of the file whose level of importance is set to the highest level, from among the files belonging to that group.

A power-saving control method for executing power-saving control of a storage apparatus is also provided according to another aspect of the invention, wherein the method includes: a first step of executing first file migration processing for obtaining access logs for a plurality of files stored in the storage apparatus, detecting a user access pattern for each of the files based on the obtained access logs, grouping the files of similar access patterns based on the detected access pattern for each of the files, migrating each of the grouped files, by group, to different memory media individually capable of power-saving control, and setting a power-saving control schedule for each group based on the access pattern for each of the files; and a second step of executing power-saving control of each of the memory media in accordance with the schedule set for each group; wherein in the first step, the power-saving control schedule is set for each group based on the access pattern of the file whose level of importance is set to the highest level, from among the files belonging to that group.

Since the access pattern for files of a high level of importance is reflected in the power-saving control schedule for the relevant group, it is possible to prevent decrease in the speed of accessing files of a high level of importance and achieve power-saving.

BRIEF DESCRIPTION OF THE DRAWINGS

FIG. 4 is a conceptual diagram showing an example of the configuration of directory entries;

FIG. 8 is a conceptual diagram showing the configuration of a file management table;

FIG. 10 is a conceptual diagram showing the configuration of a file-specific access time zone table;

FIG. 11 is a conceptual diagram showing the configuration of a file group management table.

FIG. 12 is a conceptual diagram showing the configuration of a power-saving schedule management table;

FIG. 14 is a conceptual diagram explaining access logs;

FIGS. 16(A) to 16(D) are conceptual diagrams explaining various processing sequences relating to the power-saving control function according to the embodiment;

FIG. 17 is a conceptual diagram explaining various processing sequences relating to the power-saving control function according to the embodiment;

FIG. 18 is a conceptual diagram explaining various processing sequences relating to the power-saving control function according to the embodiment;

FIGS. 20(A) to 20(C) are conceptual diagrams explaining various processing sequences relating to the power-saving control function according to the embodiment;

FIGS. 22(A) to 22(C) are conceptual diagrams explaining various processing sequences relating to the power-saving control function according to the embodiment;

FIGS. 24(A) and 24(B) are conceptual diagrams explaining various processing sequences relating to the power-saving control function according to the embodiment;

FIG. 27 is a conceptual diagram explaining file grouping processing;

FIG. 28 is a conceptual diagram explaining the file grouping processing;

FIG. 31 is a conceptual diagram explaining the file grouping processing;

FIG. 32 is a conceptual diagram explaining the file grouping processing;

FIG. 33 is a chart explaining an importance level C file sorting method;

FIG. 34 is a chart explaining the importance level C file sorting method;

FIG. 35 is a conceptual diagram explaining the importance level C file sorting method;

BEST MODE FOR CARRYING OUT THE INVENTION

An embodiment of the present invention will be explained in detail with reference to the attached drawings.

(1) Configuration of Computer System According to this Embodiment

Figure 1:
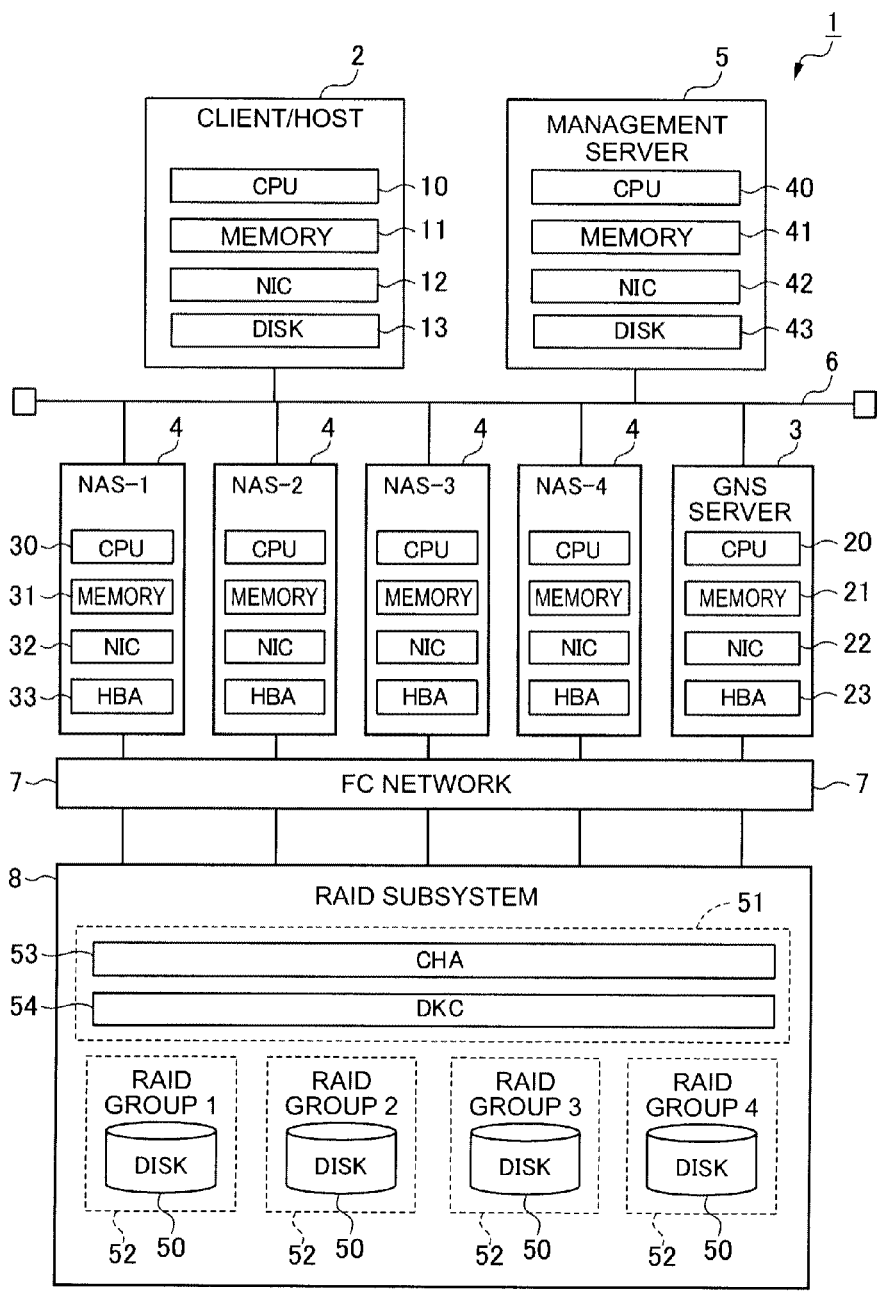
FIG. 1 is a block diagram showing the hardware configuration of a computer system according to an embodiment of the present invention.

Referring to FIG. 1, reference numeral "1" represents a computer system as a whole according to an embodiment of the present invention. This computer system 1 is configured so that a client/host 2, a GNS server 3, a plurality of NAS (Network Attached Storage) servers 4, and a management server 5 are connected to each other via a network 6 such as a LAN (Local Area Network) or a SAN (Storage Area Network), and the GNS server 3 and the NAS servers 4 are connected via an FC network 7 to a RAID subsystem 8.

The client/host 2 is a computer device equipped with a CPU (Central Processing Unit) 10, a memory 11, an NIC (Network Interface Card) 12, and a disk unit 13 such as a hard disk unit. The client/host 2 is composed of, for example, a personal computer, a workstation, or a mainframe.

The GNS server 3 is a server that unifies a plurality of NAS servers 4 and makes them recognized by the client/host 2 as a single global name space (GNS); and the GNS server 3 is equipped with information processing resources such as a CPU 20 and a memory 21. The GNS server 3 is connected via an NIC 22 to the network 6 and can thereby communicate with the client/host 2 and the management server 5 via the network 6. The GNS server 3 is also connected via an HBA (Host Bus Adapter) 23 to the FC network 7 and can thereby read various programs and data from the RAID subsystem 8 via the FC network 7.

Each NAS server 4 is a server for providing a file sharing service to the client/host 2 and is equipped with information processing resources such as a CPU 30 and a memory 31. Each NAS server 4 is connected, like the GNS server 3, via an NIC 32 to the network 6 and can thereby exchange various commands and data with the GNS server 3 and the management server 5 via the network 6. The NAS server 4 is also connected via an HBA 33 to the FC network 7 and can thereby read/write data from the client/host 2 from/to the RAID subsystem 8 via the FC network 7.

The management server 5 is a server used by a system administrator to manage the GNS server 3, the NAS servers 4, the FC network 7, and the RAID subsystem 8 in the computer system 1, and is composed of, for example, a personal computer or a workstation. The management server 5 is equipped with, for example, a CPU 40, a memory 41, an NIC 42, and a disk unit 43, and is connected via the NIC 42 to the network 6. The management server 5 is also connected to the RAID subsystem 8 via a network which is not shown in the drawing, so that the management server 5 can control the RAID subsystem 8 via that network.

The FC network 7 is constituted from one or more FC switches. The GNS server 3 or the NAS servers 4 exchange data or commands with the RAID subsystem 8 via this FC network 7.

The RAID subsystem 8 is a storage apparatus constituted from one or more disk units 50 and a control unit 51 for controlling inputting/outputting data to/from the disk units 50.

The disk units 50 are constituted from, for example, expensive disks such as SCSI (Small Computer System Interface) disks or inexpensive disks such as SATA (Serial AT Attachment) disks or optical disks. One or more disk units 50 constitutes one RAID group 52, so that one or more logical volumes are set in physical storage areas provided by each of the disk units 50 constituting one RAID group 52. Data from the client/host 2 is stored by block of a specified size in a logical volume (hereinafter referred to as the "logical block").

Each logical volume is given its unique volume number. In this embodiment, data is input or output by designating the relevant address which is a combination of the volume number and a block number assigned to each logical block (LBA: Logical Block Address).

The control unit 51 is constituted from one or more channel adapters (CHA) 53 and one or more disk controllers (DKC) 54. In response to an I/O (Input/Output) request from the client/host 2, the channel adapter 53 for the control unit 51 receives an I/O request given by the NAS servers 4 via the FC network 7; and in response to this I/O request, the control unit 51 reads/writes data from/to the corresponding disk unit 50 under the control of the disk controller 54.

Figure 2:
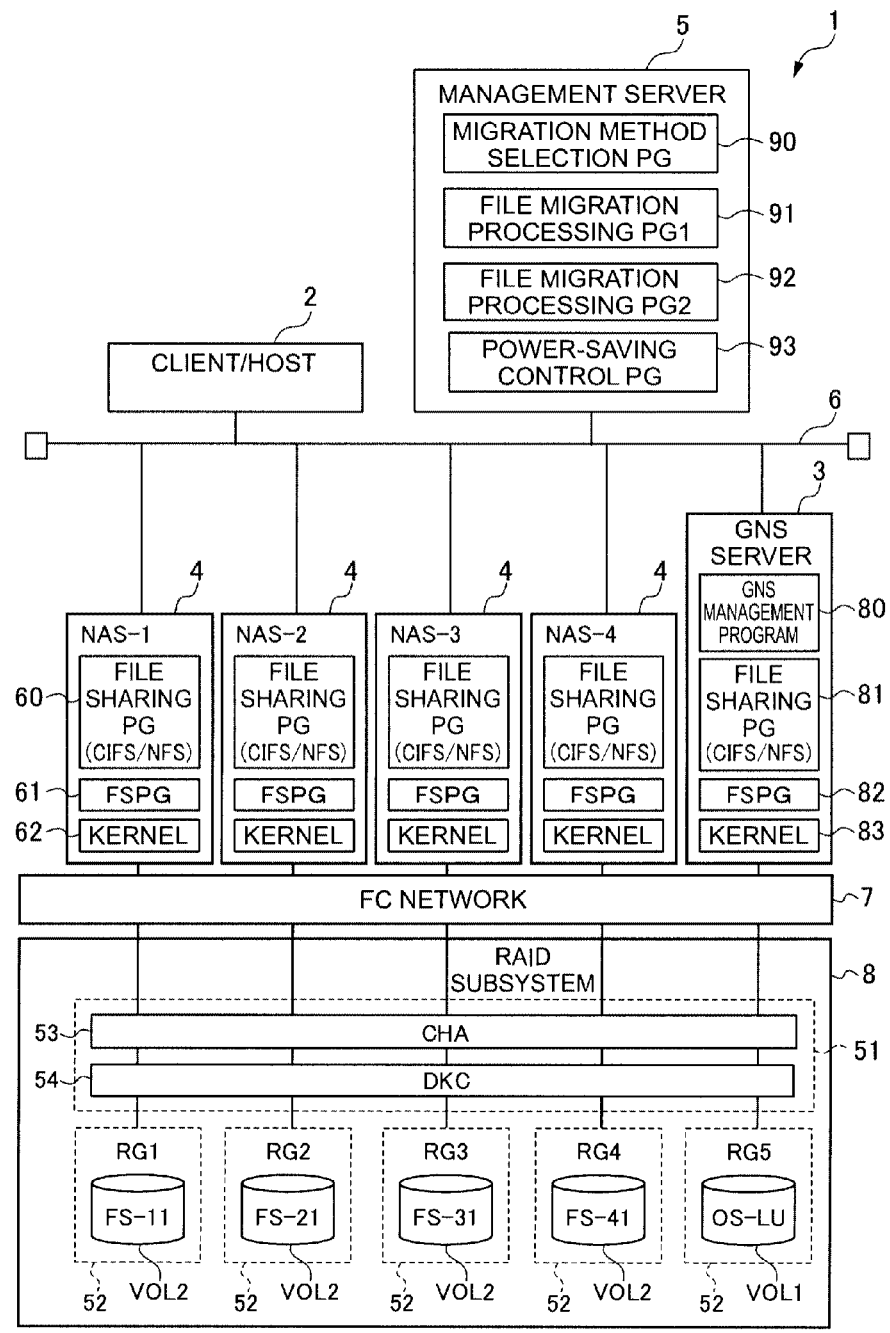
FIG. 2 is a block diagram showing the software configuration of the computer system according to the embodiment.

FIG. 2 shows the software configuration of the computer system 1. In the computer system 1, a plurality of logical volumes are created on the RAID groups 52 in the RAID subsystem 8 as described above. In the NAS environment, two types of logical volumes, OS volumes (OS-LU) VOL1 and user volumes (User-LU) VOL2, are created.

The OS volumes VOL1 are logical volumes for storing programs used by the OS (Operation System) for the GNS server 3 or the NAS servers 4. The user volumes VOL2 are logical volumes for storing data upon an I/O request from the client/host 2. Storage areas provided by the user volumes VOL2 are used by a file system.

Each NAS server 4 is equipped with a file sharing program 60, a file system program 61, and a kernel 62.

The file system program 61 is a program for managing a file system that is a logical structure configured to realize a management unit called a "file" in a physical volume.

Figure 3:
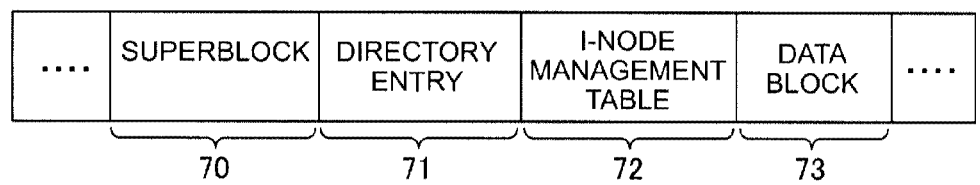
FIG. 3 is a conceptual diagram explaining a file system.

The file system is explained below. As shown in FIG. 3, the file system includes a superblock 70, a directory entry 71, an i-node management table 72, and a data block 73. Among these elements, the superblock 70 is a logical block that collectively retains information about the file system such as the size and free space of the file system.

The file system is managed by associating one file with one i-node, and this association relationship is managed by the directory entry 71. Specifically speaking, the directory entry 71 is a table that combines a directory path name 71A with an index indicating an i-node (hereinafter referred to as the "i-node number") 71B as shown in FIG. 4.

Figure 5:
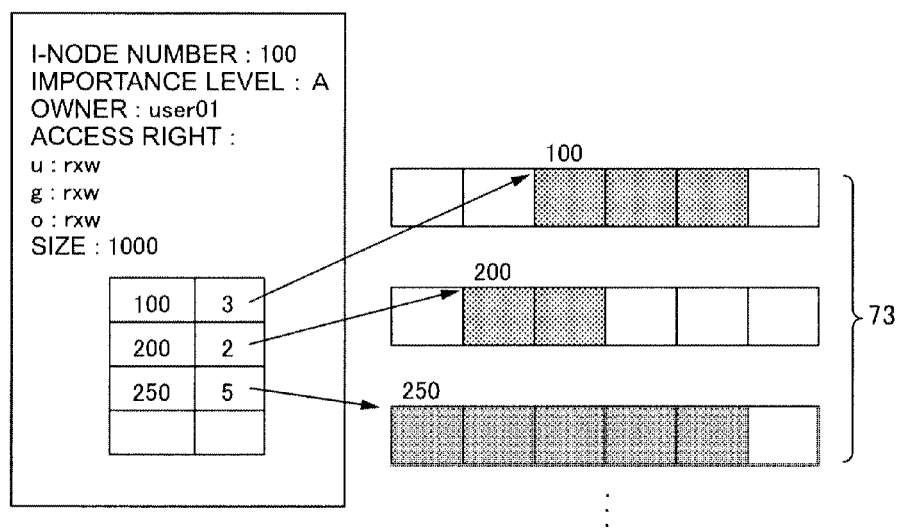
FIG. 5 is a conceptual diagram showing examples of reference to data blocks using the i-node.
Figure 6:
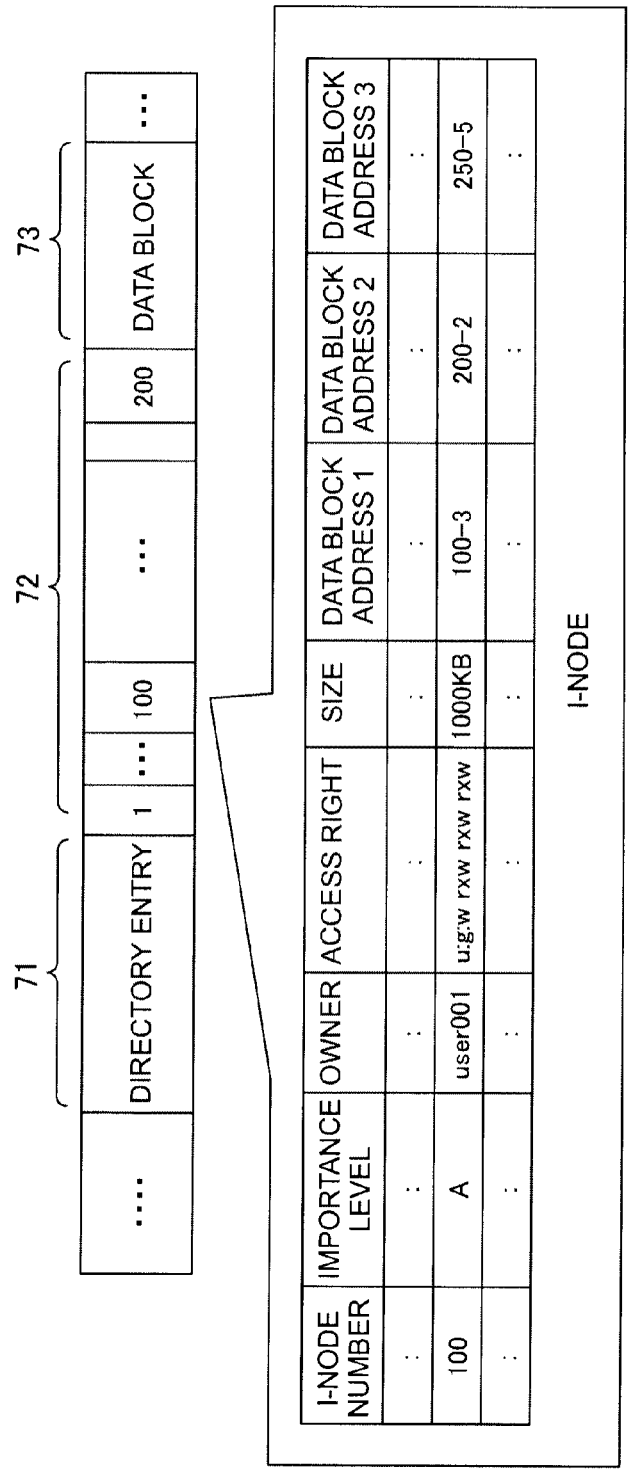
FIG. 6 is a conceptual diagram showing the relationship between an i-node management table and the i-node.

Incidentally, an "i-node" is management information about the relevant file, which is constituted from the ownership and access right in, and file size of the corresponding file, and data storage position. In this embodiment, information representing the level of importance of the relevant file as set by a user is also included in this i-node and managed as described later. FIG. 5 shows the reference relationship between the i-node and the data block 73. The numbers "100," "200," and "250" in a chart within a frame border on the left side of FIG. 5 indicate block addresses and the numbers "3," "2," and "5" indicate the number of continuous blocks, which start with the relevant block addresses, of the data block 73 storing data. The i-nodes for individual files are stored in and managed by the i-node management table 72 as shown in FIG. 6.

The data block 73 is a logical block for storing actual file data and management data.

Referring back to FIG. 2, the file sharing program 60 is a program for providing a file sharing service to the client/host 2 using communication protocols such as CIFS (Common Internet File System) or NFS (Network File System). The kernel 62 controls the overall NAS server 4 by, for example, controlling schedules of a plurality of programs (processes) operating on the NAS server 4 and handling interruptions from hardware.

Figure 7:
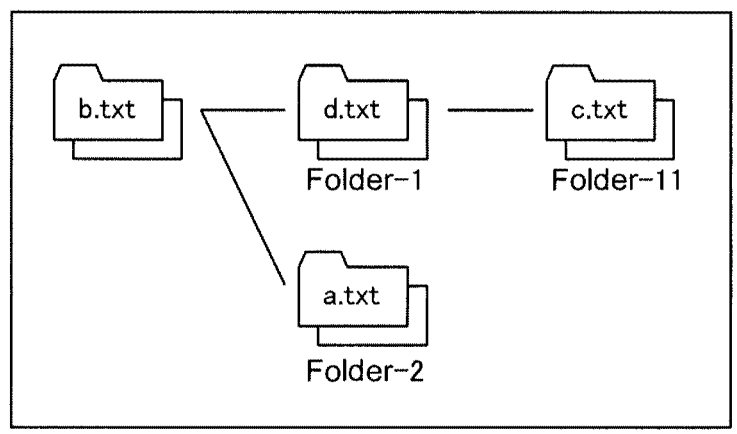
FIG. 7 is a conceptual diagram showing an example of a directory image provided by a GNS server to a client.

The GNS server 3 is equipped with a GNS management program 80. The GNS management program 80 is a program for providing the client/host 2 with a view that unifies files distributed and stored in a plurality of NAS servers 4 into a single directory image. For example, the GNS server 3 provides the client/host 2 with a directory image as shown in FIG. 7.

When the GNS server 3 provides the directory image, the GNS management program 80 creates a file management table 84 shown in FIG. 8. This file management table 84 is constituted from a "directory path name" field 84A, a "host name" field 84B, a "file system name" field 84C, and an "i-node number" field 84D. Regarding these fields, the "directory path name" field 84A stores the name of a directory path to each file belonging to a GNS provided by the GNS management program 80 to the client/host 2; and the "host name" field 84B stores the NAS name of the NAS server 4 that manages the relevant file. The "file system name" field 84C stores the file system name of a file system that provides the relevant file; and the "i-node number" field 84D stores an i-node identification number (i-node number) of the relevant file.

Figure 9:
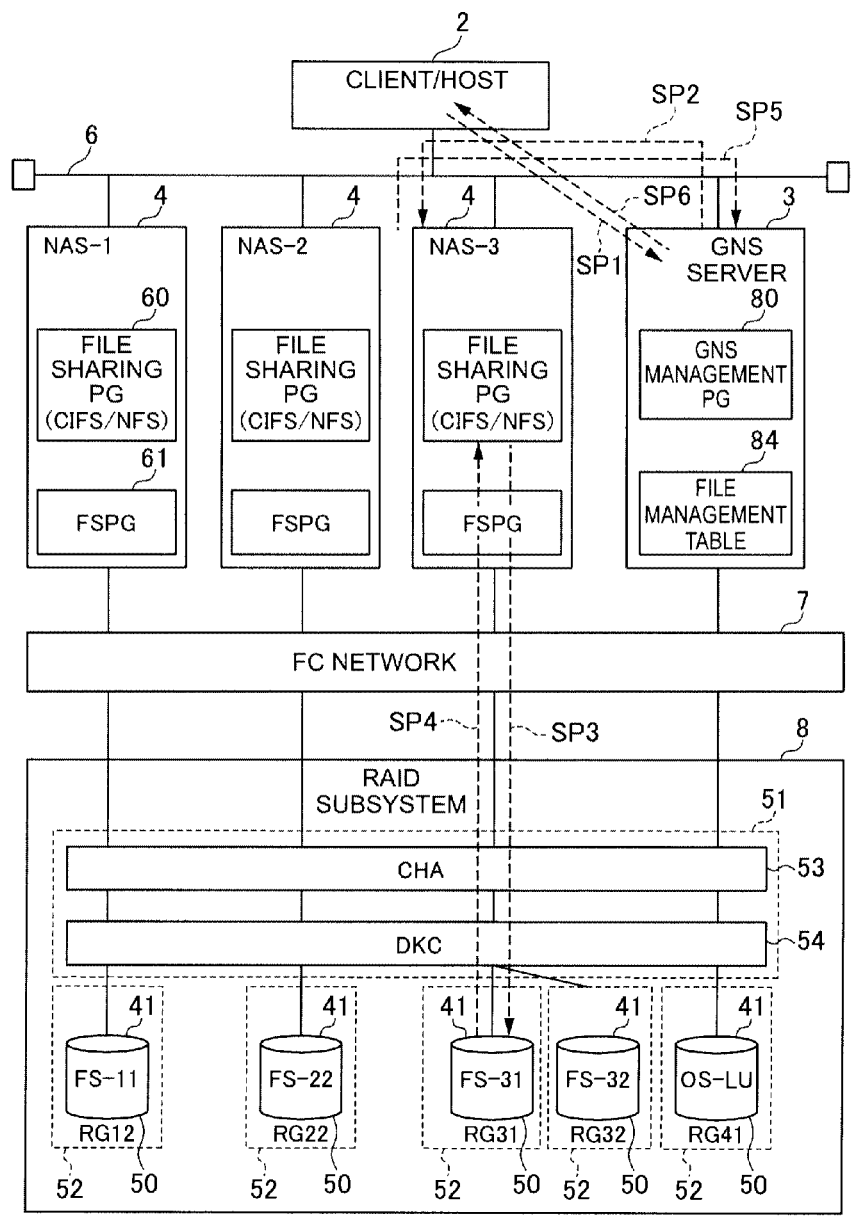
FIG. 9 is a block diagram explaining a flow of GNS processing.

If the GNS management program 80 receives a read request from the client/host 2 for a file whose directory path name is "/Holder-2/a.txt" in the example of FIG. 8 (SP1 in FIG. 9), it converts the read request to a read request for a file, whose i-node number is "1000(a.txt)," on the file system "FS31" belonging to "NAS-3" using the file management table 84 as shown in FIG. 9, and then sends this read request to "NAS-3" (SP2). In response to this read request, the "NAS-3" reads "a.txt" from the user volume VOL2 (SP3, SP4). Subsequently, this "a.txt" is transferred from "NAS-3" via the GNS server 3 to the client/host 2 (SP5, SP6).

Incidentally, besides the GNS management program 80, the GNS server 3 is equipped with a file sharing program 81, a file system program 82, and a kernel 83 as shown in FIG. 2. However, since they have similar functions to those for the NAS servers 4, any detailed explanation thereof has been omitted.

On the other hand, the management server 5 is equipped with a migration method selection program 90, a first file migration processing program 91, a second file migration processing program 92, and a power-saving control program 93 as shown in FIG. 2. The migration method selection program 90, the first file migration processing program 91, the second file migration processing program 92, and the power-saving control program 93 will be described later in detail. The management server 5 is also equipped with a file system program and a kernel although they are not shown in FIG. 2.

Furthermore, the client/host 2 is equipped with various kinds of application software, and data used by the application software is read/written from/to the RAID subsystem 8 for a data center. The client/host 2 is also equipped with a file system program and a kernel as means for achieving the above-described purpose.

(2) Power-Saving Control Function According to this Embodiment (2-1) Outline and Configuration of Various Management Tables A power-saving function of the management server 5 will be explained below. The management server 5 according to this embodiment has the power-saving function that executes power-saving control based on user access patterns for files.

In fact, the management server 5 groups files of similar user access patterns into file groups, relocates the files to the RAID groups 52 managed by the different NAS servers 4 for different file groups, and then executes power-saving control of the disk units 50 constituting the RAID groups 52 and the NAS servers 4 in charge of the RAID groups 52 based on the user access patterns. This embodiment is characterized in that among various processing relating to the power-saving controlling function as described above, processing for grouping the files based on the user access patterns is executed according to the levels of importance that are set to the files in advance.

As a means for executing various processing based on such a power-saving control function, the memory 41 for the management server 5 (FIG. 1) stores, in addition to the file management table 84 described above with reference to FIG. 8, a file-specific access time zone table 100, a file group management table 101, and a power-saving schedule management table 102 as shown in FIGS. 10 to 12.

The file-specific access time zone table 100 is a table that analyses access logs collected from each NAS server and shows access time zones for each file. As shown in FIG. 10, the file-specific access time zone table 100 is constituted from a "directory path name" field 100A, an "importance level" field 100B, and an "access time zone management" field 100C. The "directory path name" field 100A stores the name of a directory path to the corresponding file; and the "importance level" field 100B stores the level of importance set to the relevant file by the user in advance. In this embodiment, there are three levels of importance, "A" to "C"; and "A" is the highest level of importance and "C" is the lowest level of importance.

The "access time zone management" field 100C is constituted from as many "time zone" fields 100D as corresponds to previously set resolution. These "time zone" fields 100D corresponds to any of the time zones in a day, respectively. Each "time zone" field 100D stores a flag indicating whether or not the relevant file has been accessed during that time zone (hereinafter referred to as the "access flag").

If the user has not accessed the relevant file during the relevant time zone, the access flag is set to "0"; and if the user has accessed the file during the relevant time zone, the access flag is set to "1." Incidentally, the "time zone" fields 100D whose access flags are set to "1" are shaded in FIG. 10.

Therefore, in the example shown in FIG. 10, the level of importance for a file whose directory path name is "/File-1.txt" is set to "B"; and FIG. 10 shows that this file was accessed during each of the time zones "T1 to T2," "T5 to T6," and "T6 to T7."

The file group management table 101 is a table for grouping and managing files of similar access patterns and is created for each file group. Since the configuration of this file group management table 101 is similar to that of the file-specific access time zone table as shown in FIG. 11, a detailed explanation thereof has been omitted.

The power-saving schedule management table 102 is a table for managing a power-saving schedule for each file group (hereinafter referred to as the "power-saving schedule"), and is constituted from a "file group name" field 102A, a "RAID group name" field 102B, and a "power-saving time zone" field 102C as shown in FIG. 12.

The "file group name" field 102A stores a group name of the corresponding file group; and the "RAID group name" field 102B stores an identifier (RAID group name) for the RAID group 52 (FIG. 1) in which each file belonging to the relevant file group is located.

The "power-saving time zone" field 102C is constituted from the same number of "time zone" fields 102D as that of the "access time zone" fields 100C in the file-specific access time zone table 100 (FIG. 11), and each "time zone" field 102D stores a flag indicating whether or not power-saving is to be executed during the relevant time zone (hereinafter referred to as the "power-saving mode selection flag"). If power-saving is to be executed during the relevant time zone, the power-saving mode selection flag is set to "0"; and if normal operation is to be executed during the relevant time zone, the power-saving mode selection flag is set to "1." The "time zone" fields 102D of the time zones to which the power-saving mode selection flag is set to "1" are shaded in FIG. 12.

Incidentally, the "power-saving" for a RAID group 52 hereinafter means a reduction in the number of, or stopping (so-called "spin-down") of, disk revolutions of each of the disk units 50 constituting the RAID group 52; and the "power-saving" for a NAS server 4 means lowering a clock frequency of the CPU 30 (so-called "clock-down").

(2-2) Various Processing Relating to Power-Saving Function

Next, flows of various processing sequences relating to the power-saving function according to this embodiment will be explained. First, processing for grouping files based on the user access patterns according to the levels of importance of the files and relocating the files belonging to each file group will be explained with reference to FIGS. 13 to 26.

Figure 13:
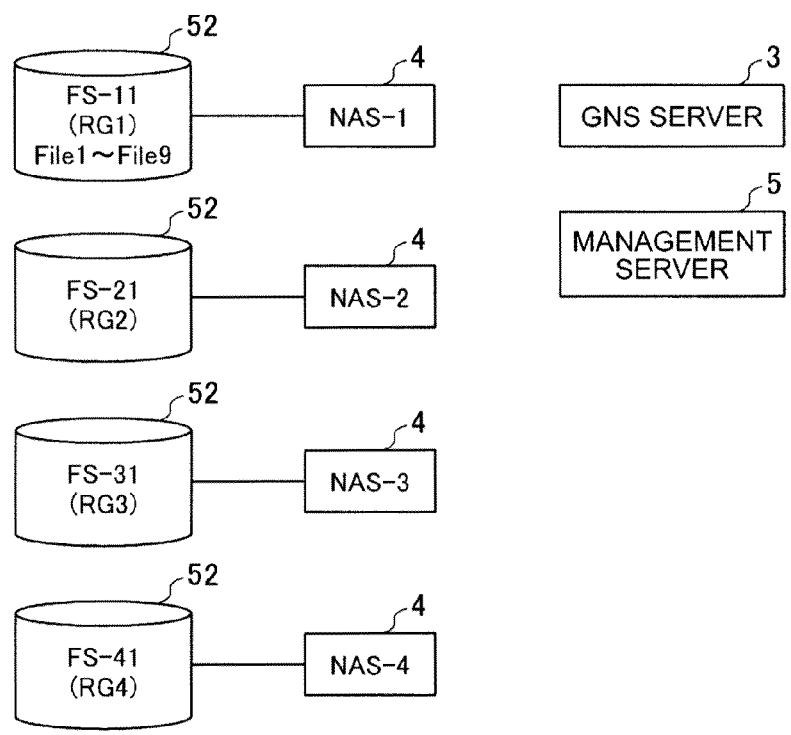
FIG. 13 is a conceptual diagram explaining various processing sequences relating to a power-saving control function according to the embodiment.

Incidentally, in the situation described below as shown in FIG. 13, a NAS server 4 named "NAS-1" is associated with a file system named "FS-11" for managing storage areas provided by a RAID group 52 named "RG1"; a NAS server 4 named "NAS-2" is associated with a file system named "FS-21" for managing storage areas provided by a RAID group 52 named "RG2"; a NAS server 4 named "NAS-3 is associated with a file system named "FS-31" for managing storage areas provided by a RAID group 52 named "RG3"; and a NAS server 4 named "NAS-4" is associated with a file system named "FS-41" for managing storage areas provided by a RAID group 52 named "RG4."

Moreover, in the situation described below, "FS-11" stores nine files "File-1" to "File-9" and the file systems "FS-21," "FS-31," and "FS-41" other than "FS-11" store no files. Furthermore, "NAS-1" holds access logs regarding accesses by users to "File 1" to "File 9." Each access log held by the NAS server 4 is constituted from a file name of the relevant file accessed by a user, the user's identifier (user ID), and access date and time as shown in FIG. 14.

Figure 15:
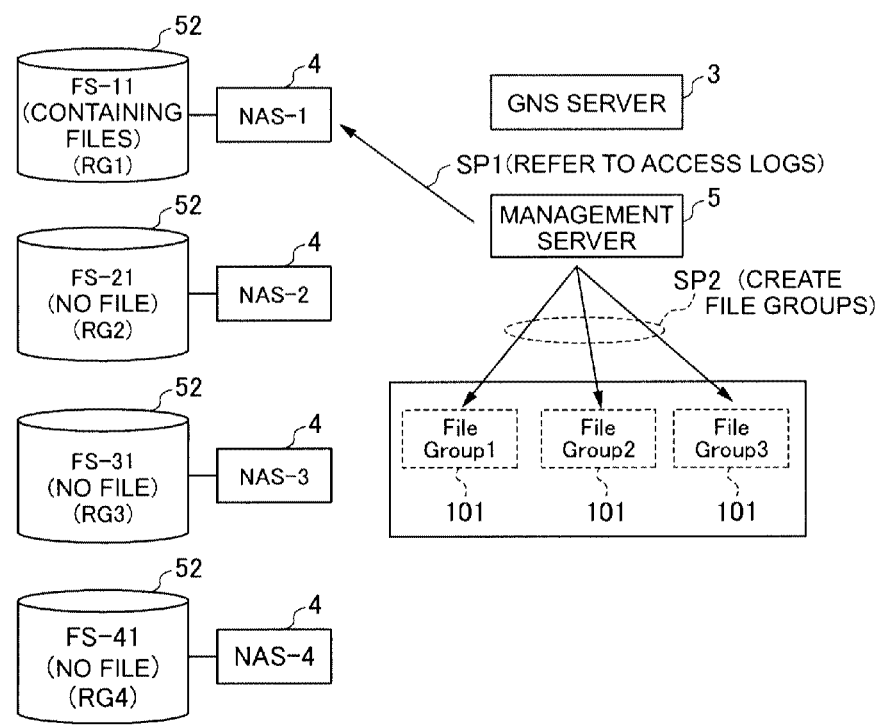
FIG. 15 is a conceptual diagram explaining various processing sequences relating to the power-saving control function according to the embodiment.

In the example described above, the management server 5 accesses "NAS-1" and obtains all the access logs for all the files ("File-1" to "File-9") stored in "FS-11" as shown in FIG. 15 (SP1 in FIG. 15).

Next, the management server 5 groups files which are of the highest level of importance (files of importance level "A") and whose access patterns are similar, based on the obtained access logs.

Specifically speaking, the management server 5 creates the file-specific access time zone table 100 (FIG. 10) based on the access logs obtained from "NAS-1." Regarding the levels of importance of individual files when creating the file-specific access time zone table 100, reference is made to information about the levels of importance which is contained in the i-node of the relevant file (as described with reference to FIGS. 5 and 6) as managed by the management server 5.

Next, the management server 5 extracts files of importance level "A" from among the files registered in the file-specific access time zone table 100 created as described above. If the then-created file-specific access time zone table 100 is as shown in FIG. 16(A), "File-2," "File-5," "File-8," and "File-9" are extracted.

The management server 5 refers to time zones during which the files of importance level "A" have been accessed, and groups files of similar access patterns into file groups. In the example shown in FIG. 16(A), access patterns for "File-5" and "File-9" are similar to each other, while access patterns for the other files are not similar. Therefore, "File-5" and "File-9" are grouped into one file group ("FileGroup-2" in FIG. 16(C)). Besides this file group, a file group to which "File-2" belongs ("FileGroup-1" in FIG. 16(B)) and a file group to which "File-8" belongs ("FileGroup-3" in FIG. 16(D)) are created. Incidentally, the method of file grouping processing for grouping files based on access patterns will be explained later.

The management server 5 then creates the file group management table 101 (FIG. 11) for each file group formed by the aforementioned file grouping processing and registers necessary information about the files belonging to the corresponding file groups in the created file group management tables 101, respectively (SP2 in FIG. 15).

Subsequently, the management server 5 associates each file group created by the above-described processing with each RAID group 52, a consolidation destination, into which files belonging to the relevant file group are to be migrated (relocated) and consolidated as shown in FIGS. 17 and 18. Incidentally, the RAID groups 52 individually capable of power-saving control are selected to be associated with the file groups, respectively. Furthermore, the management server 5 registers the group name of each file group and the group name of the RAID group 52 associated with that file group in the power-saving schedule management table 102 and also set a schedule for executing power-saving control of each registered file group (hereinafter referred to as the "power-saving schedule") to the power-saving schedule management table 102 (SP3).

Referring to FIG. 16(B) in the example shown in FIG. 16, "File-2" belonging to "FileGroup-1" is accessed during time zones "T2 to T3" and "T3 to T4," but it is not accessed during other time zones. Therefore, it is possible to assume that there will be no problem with accesses by users to "File-2" even if the disk units 50 constituting the RAID group 52 which stores "File-2" are shifted to a power-saving mode during the time zones other than "T2 to T3" and "T3 to T4." As a result, the management server 5 sets a schedule, in which only the power-saving mode selection flags for "FileGroup-1" corresponding to the time zones "T2 to T3" and "T3 to T4" respectively are on and the power-saving mode selection flags for other time zones are off, to the power-saving schedule management table 102.

Referring to FIG. 16(C) regarding "FileGroup-2," "File-5" or "File-9" is not accessed during time zones other than "T4 to T5," "T5 to T6," and "T6 to T7." Therefore, it is possible to assume that there will be no problem with accesses by users to "File-5" and "File-9" even if the disk units 50 constituting the RAID group 52 which stores "File-5" and "File-9" are shifted to the power-saving mode during the time zones other than "T4 to T5," "T5 to T6," and "T6 to T7." As a result, the management server 5 sets a schedule, in which only the power-saving mode selection flags for "FileGroup-2" corresponding to the time zones "T4 to T5," "T5 to T6," and "T6 to T7" respectively are on and the power-saving mode selection flags for other time zones are off, to the power-saving schedule management table 102.

Regarding "FileGroup-3," the management server 5 further sets a schedule, in which only the power-saving mode selection flags corresponding to the time zones "T1 to T2" and "T7 to T8" are on and the power-saving mode selection flags for other time zones are off, to the power-saving schedule management table 102 in the same manner as described above.

As a result of the above-described processing, grouping of the files of the highest level of importance (files of importance level "A") and creation of the power-saving schedule for each file group are completed.

Figure 19:
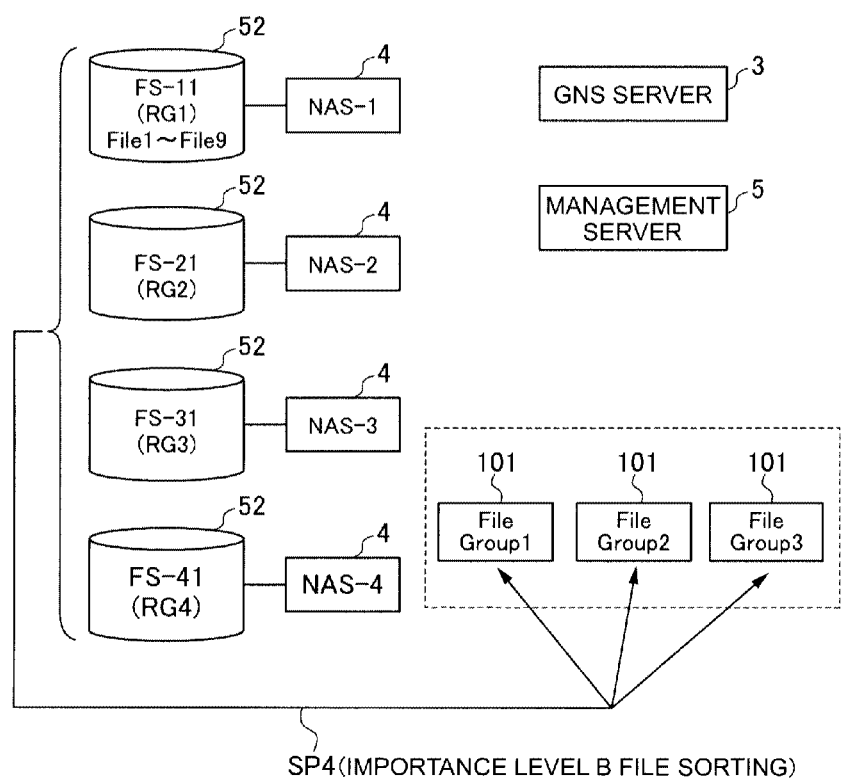
FIG. 19 is a conceptual diagram explaining various processing sequences relating to the power-saving control function according to the embodiment.
Figure 21:
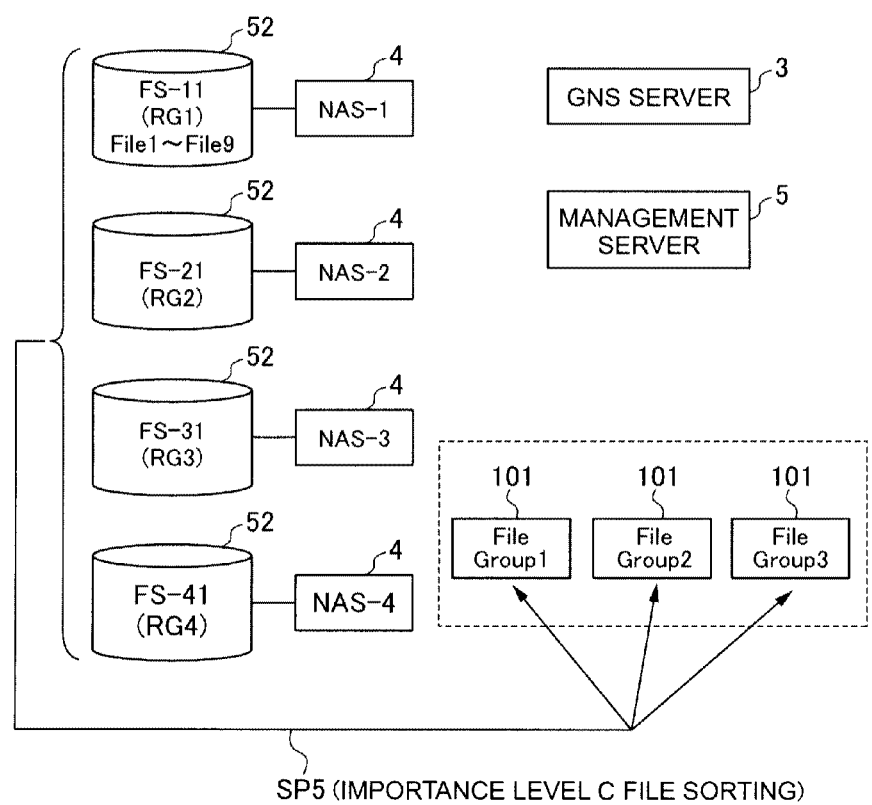
FIG. 21 is a conceptual diagram explaining various processing sequences relating to the power-saving control function according to the embodiment.
Figure 23:
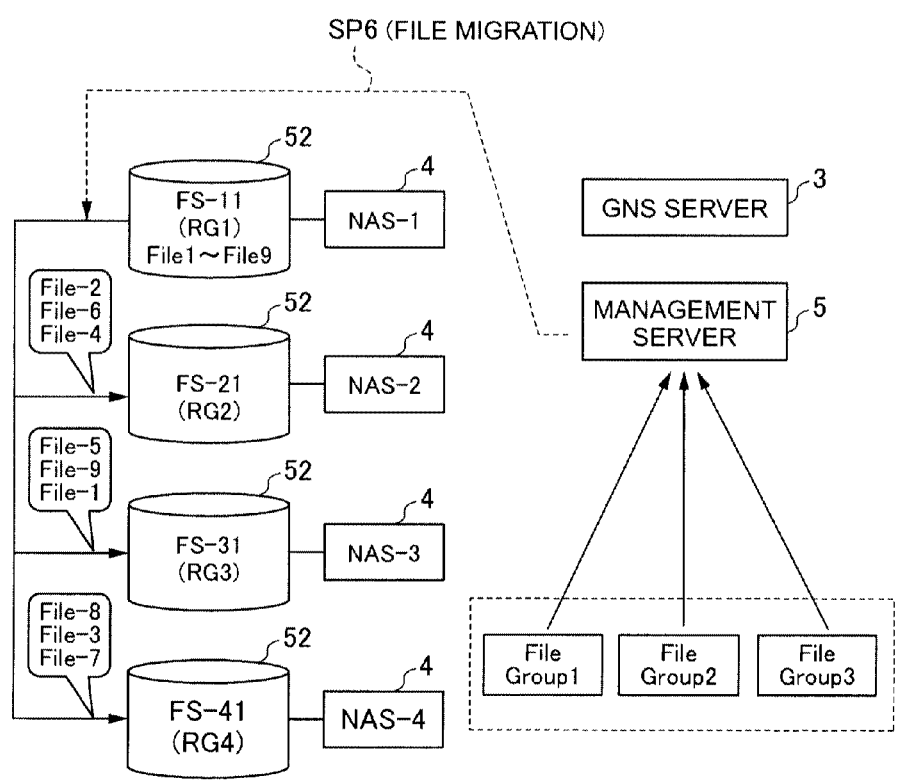
FIG. 23 is a conceptual diagram explaining various processing sequences relating to the power-saving control function according to the embodiment.
Figure 25:
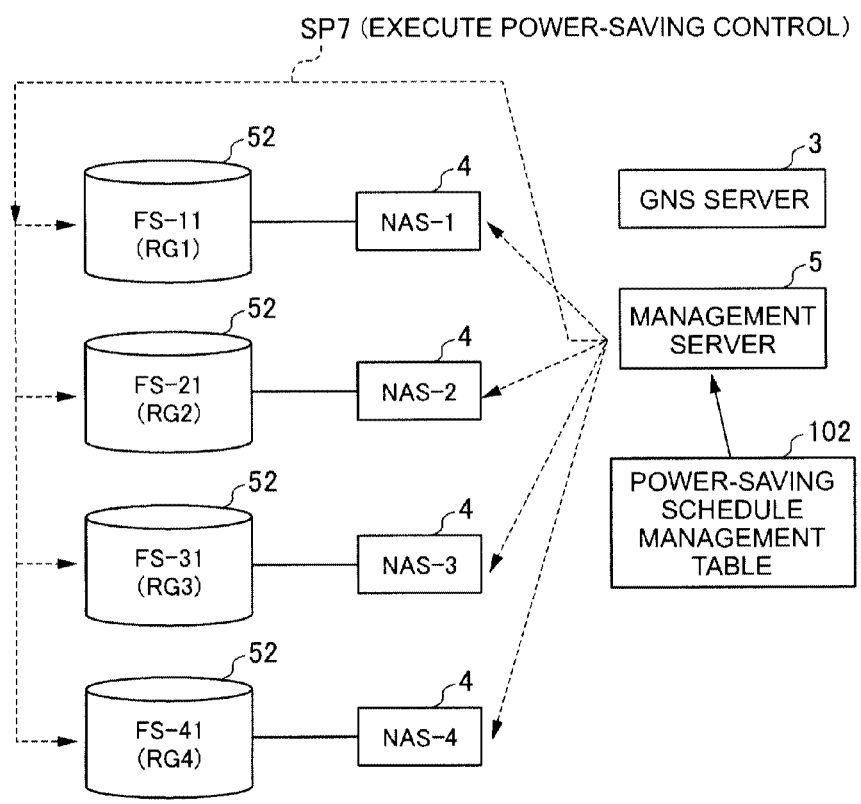
FIG. 25 is a conceptual diagram explaining various processing sequences relating to the power-saving control function according to the embodiment.

Next, the management server 5 sorts each file of the second highest importance (each file of importance level "B") to the file group to which the power-saving schedule similar to the user access pattern for that file is set, as shown in FIG. 19 (SP4).

In the example shown in FIG. 16(A), there are three files of importance level "B," "File-1," "File-3," and "File-6." The user access pattern for "File-1" is closest to the power-saving schedule for "FileGroup-2"; the user access pattern for "File-3" is closest to the power-saving schedule for "FileGroup-3"; and the user access pattern for "File-6" is closest to the power-saving schedule for "FileGroup-1." Then, the management server 5 registers "File-1" in the file group management table 101 for "FileGroup-2," "File-3" in the file group management table 101 for "FileGroup-3," and "File-6" in the file group management table 101 for "FileGroup-1" as shown in FIGS. 20(A) to 20(C). Incidentally, the mark "X" in FIG. 20 indicates that the time zone with that mark requires a certain amount of time after the acceptance of an access until the relevant file can be actually accessed, because the disk units 50 constituting the RAID group 52 storing that file during the relevant time zone are in the power-saving mode.

Next, the management server 5 sorts each file of the lowest level of importance (each file of importance level "C") to any of the file groups for convenience of the system, for example, from the viewpoint of the capacity of each RAID group 52 associated with each file group or the load distribution, without considering the user access pattern for that file (SP5).

In the example of FIG. 16(A), there are two files of importance level "C," "File-4" and "File-7." Therefore, the management server 5 sorts these two files for convenience of the system, for example, as shown in FIGS. 22(A) to 22(C), and registers "File-4" and "File-7" in the file group management tables 101 corresponding to the file groups to which the files have been sorted, respectively.

Subsequently, the management server 5 controls the RAID subsystem 8 based on the file group management table 101 created as described above for each file group and thereby migrates data of the files belonging to each file group to the relevant RAID group 52 associated with that file group (to be precise, the migration of data of the files to the relevant RAID group 52 shall hereinafter means migration of the data to logical volumes set in the storage areas provided by the RAID groups 52) (SP6). Along with the migration of the files, the management server 5 updates the file management table 84 (FIG. 8) in the GNS server 3. Therefore, in this example, the file management table 84 whose content is as shown in FIG. 24(A) is updated to as shown in FIG. 24(B). Incidentally, the processing from step SP1 to step SP6 shall be hereinafter referred to as the "first file migration processing."

Next, the management server 5 controls the operating mode of the RAID subsystem 8 and the corresponding NAS servers 4 in accordance with the power-saving schedule management table 102. Specifically speaking, the management server 5 shifts the operating mode of each of the disk units 50, which constitute the RAID group storing each file belonging to the file group which should be in the power-saving mode at that time, to the power-saving mode (for example, the operating mode in which the number of disk revolutions is made to spin down). At the same time, the management server 5 gives an instruction to the NAS server 4 managing the RAID group 52 to shift the operating mode to the power-saving mode (for example, the operating mode in which the clock frequency of the CPU 30 is lowered, so-called "clocked down") (SP7).

Figure 26:
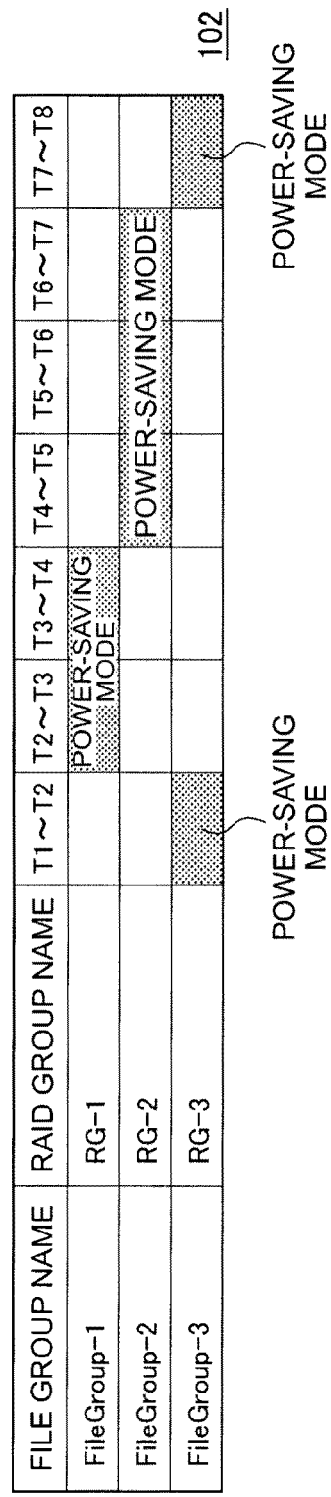
FIG. 26 is a conceptual diagram explaining various processing sequences relating to the power-saving control function according to the embodiment.

Subsequently, the management server 5 shifts the operating mode of each disk unit 50 constituting the RAID group 52 and each NAS server 4 from the power-saving mode to the normal mode or from the normal mode to the power-saving mode as needed by controlling the RAID subsystem 8 and the NAS server 4 in accordance with the power-saving schedule management table 102 as shown in FIG. 26 (SP7). As a result, the power-saving control is executed in accordance with the power-saving schedule management table 102.

Furthermore, when a certain amount of time has elapsed since the execution of the first file migration processing, the management server 5 judges whether the first file migration processing should be executed again or not. If a certain amount of time has not elapsed since the execution of the first file migration processing, the management server 5 executes processing for, for example, sorting a new file to any of the file groups without reconstructing the existing file groups and migrating the new file to the RAID group 52 associated with that file group (hereinafter referred to as the "second file migration processing").

(2-3) File Grouping Processing

Next, a general method of file grouping processing for grouping files of similar user access patterns will be explained. Incidentally, the case where five files, "file A" to "file E," are accessed in access patterns respectively as shown in FIG. 27 will be explained.

First, time resolution (for example, 30 minutes or one hour) is determined and a user access pattern for each file is bit-mapped as shown in FIG. 28. If the resolution is one hour, the bitmap size per file is 24 bits. When the user access pattern for a file is bitmapped, fractions larger than a half of the time resolution are rounded up and fractions smaller than a half of the time resolution are rounded off. Therefore, if the resolution is one hour and the relevant file is accessed by a user from "5:45" to "13:05," the following calculation is performed assuming that the file is accessed from "6:00" to "13:00." Incidentally, FIG. 28 is a bitmap of user access patterns for "file A" to "file E" when the resolution is set to one hour.

Subsequently, grouping of "file A" to "file E" is performed using the bitmap created as described above. Specifically speaking, a bitwise XOR operation for each time zone is performed regarding the bitmap for "file A" to "file E." If the operation result is equal to or less than a predetermined threshold value, it is determined that the user access patterns for the relevant files are similar to each other.

Figure 29:
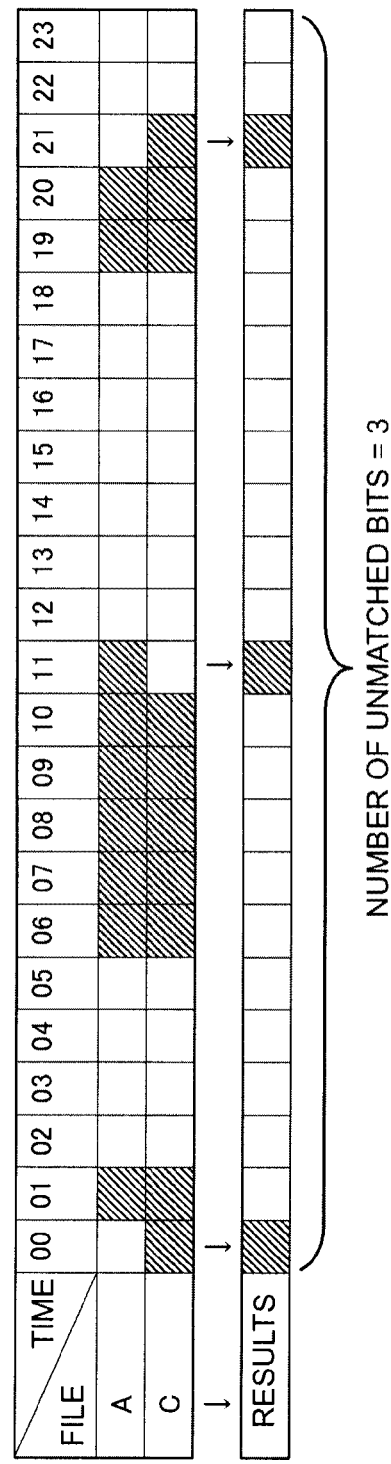
FIG. 29 is a conceptual diagram explaining the file grouping processing.

If the XOR operation is performed between "file A" and "file B" to "file E" in the example shown in FIG. 28 and if the threshold value is "3," there are three unmatched bits (time zones) regarding "file C" as shown in FIG. 29 and there are four or more unmatched bits regarding "file B," "file D," and "file E." As a result, only "file C" is sorted to the same file group as that of "file A."

Figure 30:
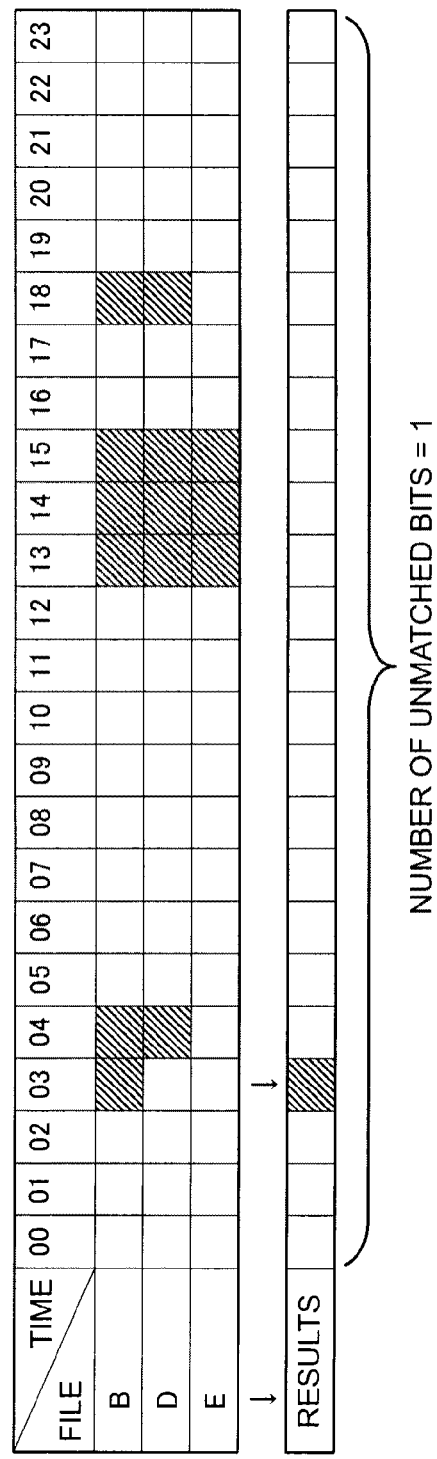
FIG. 30 is a conceptual diagram explaining the file grouping processing.

If the XOR operation is performed in the same manner for each time zone regarding three files, "file B," "file D," and "file E," there is one unmatched bit as shown in FIG. 30. As a result, these three files are sorted to the same file group.

Subsequently, an access pattern for the entire file group obtained as described above will be found. Specifically speaking, a bitwise OR operation is performed regarding access patterns for the files sorted to each file group, and the obtained operation result can be considered as an access pattern for the entire file group. If a file group constituted from "file A" and "file C" is named "Group-1" and a file group constituted from "file B," "file D," and "file E" is named "Group-2" in the example shown in FIG. 28, access patterns for the entire groups "Group-1" and "Group-2" are as shown in FIG. 31.

If a new file which has not been sorted to any of the file groups exists after that during the second file migration processing, the XOR operation is performed for each bit (time zone) between the user access pattern for the new file and the access pattern for each entire file group. If any file group whose number of unmatched bits is equal to or less than the threshold value exists, the new file is sorted to that file group; and if such a file group does not exist, a new file group is created.

However, in this embodiment, a new file group is created for a new file only when the level of importance of that new file is "A." If the level of importance of the new file is "B," the new file is sorted to a file group whose access pattern is most similar to that of the new file (in other words, the file group which has the smallest number of unmatched time zones). If the level of importance of the new file is "C," the new file is sorted to any of the file groups for convenience of the system without consideration of the user access pattern for the new file.

Incidentally, if a file that is always accessed, like "file F" in FIG. 32, exists when the above-described method of file grouping processing is used, all the access patterns for other files ("file A" to "file E") will be consolidated into the access pattern for "file F."

Therefore, in order to avoid the above-described situation, the management server 5 according to this embodiment first filters files accessed during the time zones equal to or more than a predetermined threshold value among the all the divided time zones (for examples, files that are accessed during 75% or more of 24-hour time zones), and then executes the file grouping processing described above with reference to FIGS. 27 to 31. Regarding the files removed by filtering, a special file group is created and the relevant files are sorted to that special file group (steps SP23, SP27, and SP30 in FIG. 37 and steps SP48, SP51, and SP55 in FIG. 38).

(2-4) Method for Sorting Files of Importance Level "C"

The method for sorting files of importance level "C" will be explained below. There are two possible methods for sorting files of importance level "C" to any of the file groups: a method of sorting files based on free spaces of the file systems (hereinafter referred to as the "first sorting method"); and a sorting method in consideration of load distribution (hereinafter referred to as the "second sorting method").

First, the first sorting method will be explained. When sorting a file of importance level "C" to any of the file groups, a sorting destination can be decided in consideration of a free space of each file system belonging to the RAID group 52 associated with each file group so that the free spaces of all the file systems will be equalized.

Specifically, the free space of each file system is first obtained from the superblock 70 of the file system as described earlier with reference to FIG. 3, and then an average value and a variance of the free spaces in these file systems are found. If the values of free spaces in the file systems called "FS-21," "FS-31," and "FS-41" are respectively as described below in the example shown in FIG. 33, an average value of the free spaces in these file systems can be found by the following formula:

[Formula 1]

$$(1000+600+800)/3=800 \quad (1)$$

The variance of the free spaces in these file systems can be found by the following formula:

[Formula 2]

$$\{(1000-800)2+(800-800)2+(600-800)2\}/3=26666.67 \quad (2)$$

Next, an average value and a variance are obtained when a file of importance level "C" is migrated to "FS-21," "FS-31," or "FS-41." If the size of a file of importance level "C" is 200 [MB] in the example shown in FIG. 33, the average value and the variance of free spaces in these file systems will become as shown in FIG. 34. Incidentally, the average value of the free spaces in these file systems after migrating the file of importance level "C" to "FS-21," "FS-31," or "FS-41" is 733.33 [MB].

The smaller the variance of the file systems is as compared to the variance ("26666.67") obtained by the formula (2) as shown in FIG. 34, the less the variations of the free spaces in the file systems after migration of the file will be. As a result, such a file system which results in a smaller variance can be decided as the migration destination of the file.

Next, the second sorting method will be explained. If files of importance level "C" are migrated to and concentrated in a file system belonging to the RAID group 52 whose operating time is short (time which should be set to the power-saving mode is long), it is possible that accesses may be concentrated during the short operating time zone and the load will thereby increase. Therefore, a possible method is to refer to the power-saving schedule management table 102 (FIG. 12) and proportionally divide the number of files of importance level "C" to be migrated to the respective file systems based on the operating time of the RAID groups 52.

If the power-saving schedule management table 102 is as shown in FIG. 35, an operating time ratio between the RAID groups 52 associated with "FileGroup-1," "FileGroup-2," and "FileGroup-3" is represented by the following formula:

[Formula 3]

$$\text{"FileGroup-1":"FileGroup-2":"FileGroup-3"}=5:4:5 \quad (3)$$

If the number of files of importance level "C" is "100," the number of files to be distributed proportionally to "File-Group-1" is calculated as follows:

[Formula 4]

$$\{5/(5+4+5)\}\times100=35 \quad (4)$$

The number of files to be distributed proportionally to "File-Group-2" is calculated as follows:

[Formula 5]

$$\{4/(5+4+5)\}\times100=30 \quad (5)$$

The number of files to be distributed proportionally to "File-Group-3" is calculated as follows:

[Formula 6]

$$\{5/(5+4+5)\}\times100=35 \quad (6)$$

The number of files obtained above is sorted to "FileGroup-1," "FileGroup-2," and "FileGroup-3" respectively, so that the files of importance level "C" can be sorted to the file groups in the state where the load is distributed among the file systems.

Incidentally, if the load on the file systems corresponding to the file groups "FileGroup-1," "FileGroup-2," and "FileGroup-3" respectively varies from one file system to another, the destination(s) to which the files of importance level "C" are to be sorted may be decided also in consideration of the load.

(2-5) Specific Processing by Management Server Relating to Power-Saving Function Next, specific processing sequences executed by the management server 5 relating to the power-saving control function according to this embodiment will be explained. Incidentally, a "program" mounted in the management server 5 will be described below as the main element that executes various processing; however, it is a matter of course that the CPU 30 for the management server 5 (FIG. 1) actually executes the processing according to that program.

(2-5-1) File Migration Method Selection Processing

Figure 36:
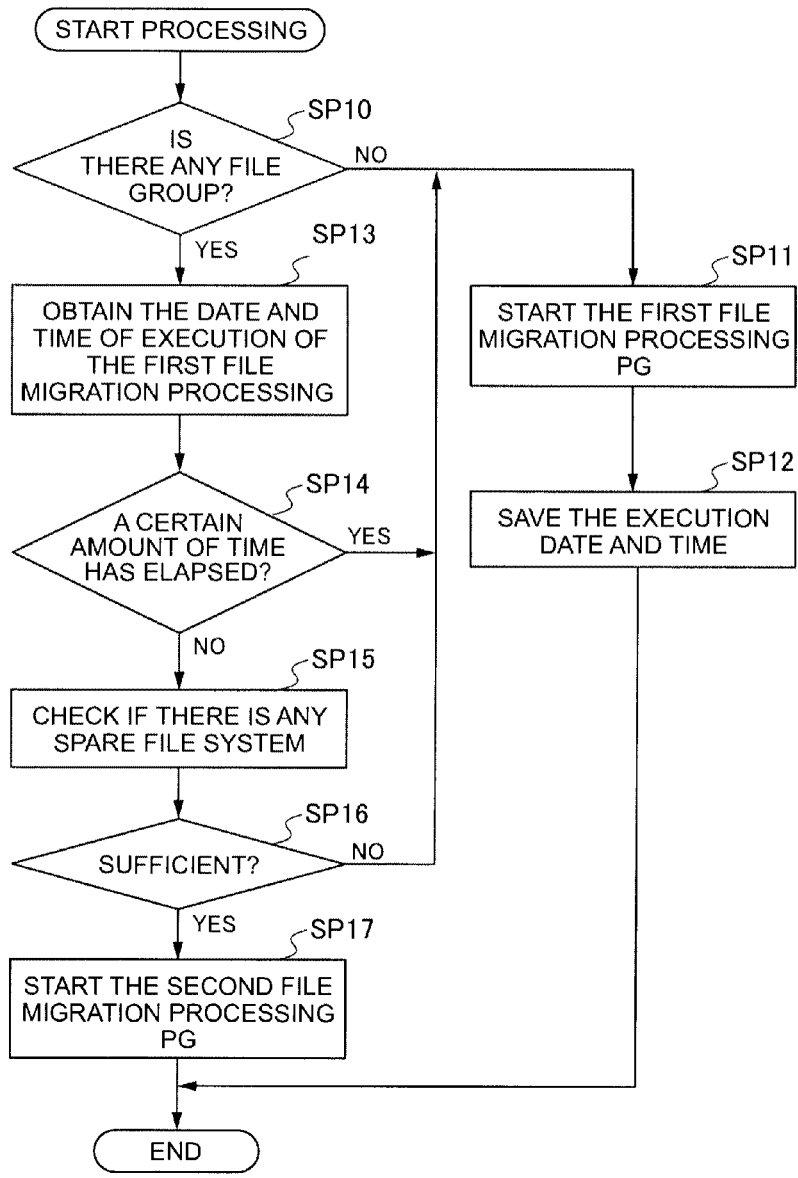
FIG. 36 is a flowchart illustrating a processing sequence for a migration method selection processing.

FIG. 36 shows a processing sequence for file migration method selection processing that is periodically executed by the migration method selection program 90 (FIG. 2) mounted in the management server 5. The migration method selection program 90 selects either the first file migration processing or the second file migration processing described above to execute file migration according to the processing procedures shown in FIG. 36.

Specifically, after starting this file migration method selection processing, the migration method selection program 90 first judges whether there is any already created file group or not, based on the existence or nonexistence of the file group management table 101 (FIG. 11) (SP10).

If a negative judgment is returned in this step, it means that the first file migration processing has not been executed yet. Therefore, when the negative judgment is returned, the migration method selection program 90 starts the first file migration processing program 91 stored in the memory 41 for the management server 5 (FIG. 1) (SP11), stores the current date and time as the date and time of the last execution of the first file migration processing in the memory 41 (SP12), and then terminates this migration method selection processing.

On the other hand, if an affirmative judgment is returned in step SP10, it means that the first file migration processing has already been executed and a file group has been created. Therefore, if the affirmative judgment is returned, the migration method selection program 90 reads the date and time of the last execution of the first file migration processing from the memory 41 (SP13).

Moreover, the migration method selection program 90 judges, based on the then read date and time of execution, whether a predetermined period of time has elapsed since the last execution of the first file migration processing (SP14). If an affirmative judgment is returned in this step, the migration method selection program 90 proceeds to step SP11 in order to execute the first file migration processing again.

On the other hand, if a negative judgment is returned in step SP14, the migration method selection program 90 checks if there is any spare file system created by the user or the administrator in advance (SP15); and then the migration method selection program 90 judges whether or not there are a sufficient number of spare file systems to execute the second file migration processing (SP16). This is because a sufficient number of spare file systems are required if a new file group needs to be added when executing the second file migration processing as described later.

If the negative judgment is returned in this step, the migration method selection program 90 proceeds to step SP11. On the other hand, if the affirmative judgment is returned, the migration method selection program 90 starts the second file migration processing program 92 (FIG. 2) stored in the memory 41 for the management server 5 (FIG. 1) (SP17) and then terminates this migration method selection processing.

(2-5-2) First File Migration Processing

Figure 37:
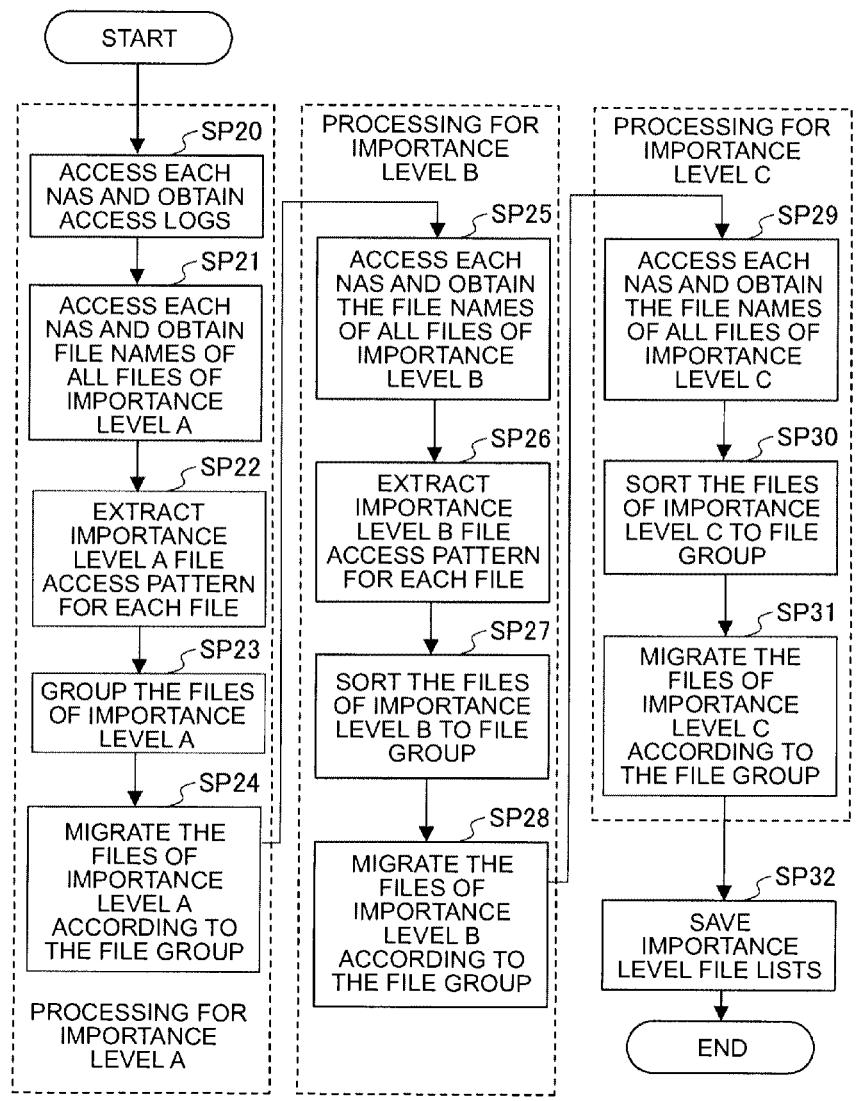
FIG. 37 is a flowchart illustrating a processing sequence for the first file migration processing.

FIG. 37 shows a processing sequence for the first file migration processing executed by the first file migration processing program 91 (FIG. 2) started in step SP11 during the migration method selection processing described above.

When the first file migration processing program 91 is activated by the migration method selection program 90, it starts the first file migration processing, first accesses each of the NAS servers 4 in the computer system 1, and obtains access logs for each of files managed by the NAS servers 4 (SP20).

Subsequently, the first file migration processing program 91 accesses each of the NAS servers 4 in the computer system 1 and obtains file names of all the files of importance level "A" from among the files managed by the NAS servers 4 (SP21).

Next, the first file migration processing program 91 extracts (detects) the user access pattern for each file of importance level "A" based on the access logs obtained in step SP20 and the search result in step SP21 (SP22).

The first file migration processing program 91 then compares the extracted access patterns for the files of importance level "A" and groups the files of similar access patterns. Subsequently, the first file migration processing unit 91 creates the file group management table 101 (FIG. 11) for each file group created as described above, and registers necessary information about the files of importance level "A" belonging to the relevant file group in the file group management table 101. The first file migration processing program 91 associates the file groups with the RAID groups 52 managed by the different NAS servers 4 respectively and registers the group name of each file group, the group name of the RAID group 52 associated with that file group, and the power-saving control schedule determined based on the access patterns of the files belonging to that file group in the power-saving schedule management table 102 (SP23).

Subsequently, the first file migration processing program 91 controls the RAID subsystem 8 and thereby migrates each file of importance level "A" to the RAID group 52 (i.e., moves data of that file to the RAID group 52) associated with the file group to which the relevant file belongs so that the files of importance level "A" will be consolidated into storage areas provided by the RAID group managed by the NAS server 4 which is different for each file group (SP24).

Next, the first file migration processing program 91 accesses each NAS server 4 in the computer system 1 and obtains the file names of all the files of importance level "B" from among the files managed by the NAS servers 4 (SP25).

The first file migration processing program 91 then extracts the user access pattern for each file of importance level "B" based on the access logs obtained in step SP20 and the file names obtained in step SP25 (SP26).

Subsequently, the first file migration processing program 91 compares the access pattern for each file of importance level "B" extracted as described above with the access pattern for each file group, sorts each file of importance level "B" to the file group whose access pattern is most closest to that of the relevant file, and registers necessary information about each file of importance level "B" in the corresponding file group management table 101 (SP27).

The first file migration processing program 91 then controls the RAID subsystem 8 and thereby migrates each file of importance level "B," which has been sorted to any of the file groups as described above, to the RAID group 52 associated with the file group to which the relevant file has been sorted (SP28).

Next, the first file migration processing program 91 accesses each NAS server 4 in the computer system 1 and obtains the file names of all the files of importance level "C" from among the files managed by the NAS servers 4 (SP29).

The first file migration processing program 91 then sorts each above-extracted file of importance level "C" to any of the file groups for convenience of the system (for example, to equalize the used space of each RAID group 52), and registers necessary information about each file of importance level "C" in the corresponding file group management table 101 (SP30).

Subsequently, the first file migration processing program 91 controls the RAID subsystem 8 and thereby migrates each file of importance level "C," which has been sorted to any of the file groups as described above, to the RAID group 52 associated with the file group to which the relevant file has been sorted (SP31).

Furthermore, the first file migration processing program 91 saves, in the memory or the like, a list of file names of the files of importance level "A" obtained in step SP21, a list of file names of the files of importance level "B" obtained in step SP25, and a list of file names of the files of importance level "C" obtained in step SP29, as importance-level-based file lists to be used for the second file migration processing described below (SP32), and then terminates this first file migration processing.

(2-5-3) Second File Migration Processing

Figure 38:
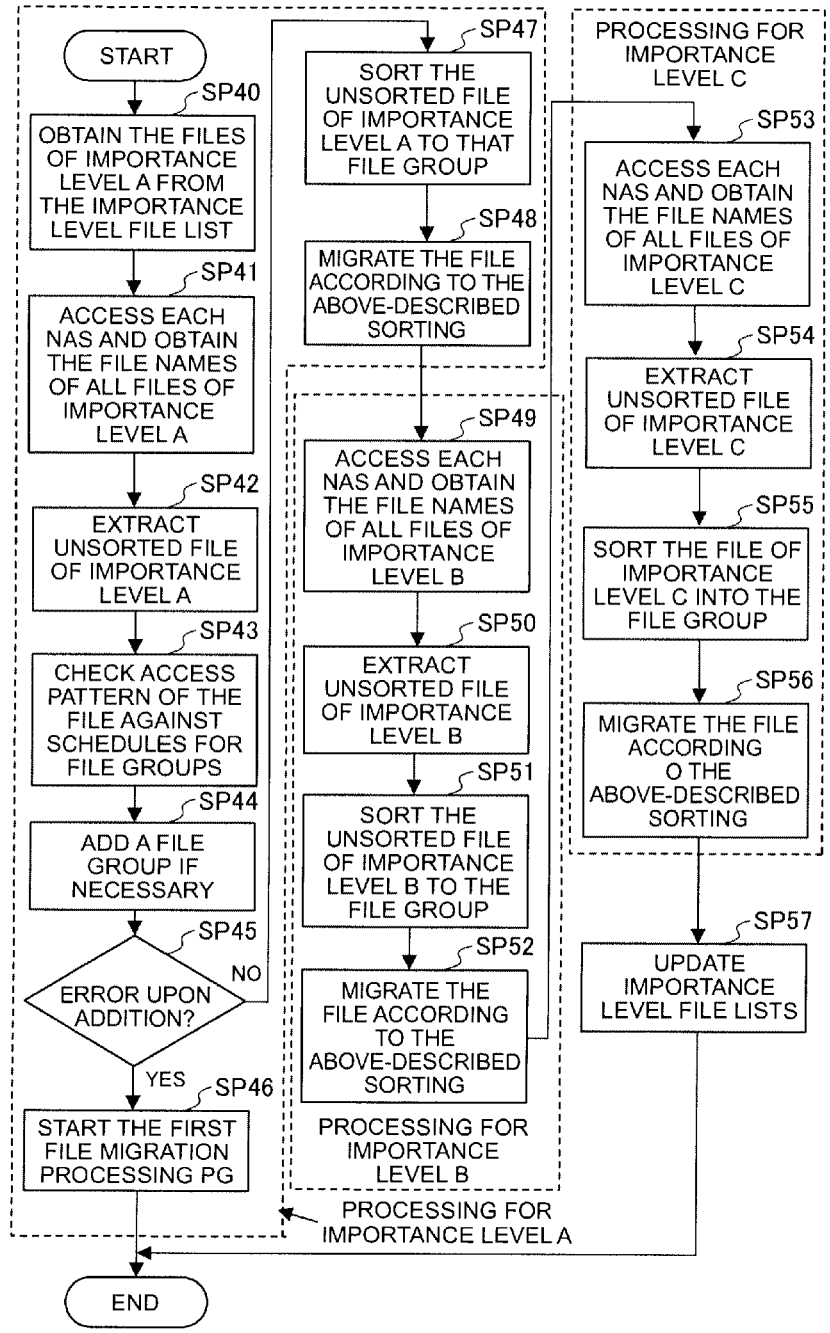
FIG. 38 is a flowchart illustrating a processing sequence for the second file migration processing.

FIG. 38 shows a processing sequence for the second file migration processing executed by the second file migration processing program 92 (FIG. 2) started by the aforementioned migration method selection processing (FIG. 36) in step SP17.

After the second file migration processing program 92 is activated by the migration method selection program 90, it starts this second file migration processing and first reads the importance level "A" file list from among the importance-level-based file lists stored in the memory 41 for the management server 5 (FIG. 1) (SP40).

Next, the second file migration processing program 92 accesses each NAS server 4 in the computer system 1 and obtains the file names of all the files of importance level "A" from among the files managed by the NAS servers 4 (SP41).

The second file migration processing program 92 then checks the importance level "A" file list obtained in step SP40 against each file name obtained in step SP41 and extracts the file names of all the files of importance level "A" which have not been sorted to any of the file groups (SP42)).

Subsequently, the second file migration processing program 92 checks the user access pattern for each file of importance level "A," whose file name has been extracted in step SP42, against the access pattern for each file group (SP43).

If the access pattern for the file of importance level "A" extracted in step SP42 is not similar to that of any file group and that file cannot be sorted to any of the file groups, the second file migration processing program 92 additionally creates a new file group corresponding to that file (SP44).

Subsequently, the second file migration processing program 92 judges whether or not an error has occurred at the time of the above-described creation of the additional file group in step SP44 (SP45). If an affirmative judgment is returned (for example, if no spare file system exists), the second file migration processing program 92 starts the first file migration processing program 91 (SP46) and then terminates this second file migration processing. As a result, in this case, the first file migration processing described earlier with reference to FIG. 37 will be started.

On the other hand, if an affirmative judgment is returned in step SP45, the second file migration processing program 92 sorts the file of importance level "A," which was extracted in step SP42 and has not been sorted to any of the file groups, to the file group whose access pattern is similar as detected as a result of the check in step SP43, or to the new file group additionally created in step SP44. Specifically speaking, the second file migration processing program 92 registers necessary information about the file of importance level "A" in the file group management table 101 (FIG. 11) corresponding to the file group to which the relevant file has been sorted. The second file migration processing program 92 also changes the schedule for the corresponding file group in the power-saving schedule management table 103 (FIG. 12) as needed (SP47).

Subsequently, the second file migration processing program 92 controls the RAID subsystem 8 and thereby migrates each file of importance level "A," which has been sorted to any of the file groups as described above, to the RAID group 52 associated with the file group to which the relevant file has been sorted (SP48).

Next, the second file migration processing program 92 accesses each NAS server 4 in the computer system 1 and obtains the file names of all the files of importance level "B" from among the files managed by the NAS servers 4 (SP49).

The second file migration processing program 92 checks the importance level "B" file list obtained in step SP40 against the file names obtained in step SP49 and extracts the file names of all the files of importance level "B" which have not been sorted to any of the file groups (SP50).

Subsequently, the second file migration processing program 92 compares the access pattern for each file of importance level "B," whose file name has been extracted as described above, with the access pattern for each file group, sorts the file to the file group whose access pattern is most closest to that of the relevant file, and registers necessary information about that file in the corresponding file group management table 101 (FIG. 11) (SP51).

The second file migration processing program 92 then controls the RAID subsystem 8 and thereby migrates each file of importance level "B," which has been sorted to any of the file groups as described above, to the RAID group 52 associated with the file group to which the relevant file has been sorted (SP52).

Next, the second file migration processing program 92 accesses each NAS server 4 in the computer system 1 and obtains the file names of all the files of importance level "C" from among the files managed by the NAS servers 4 (SP53).

The second file migration processing program 92 then checks the importance level "C" file list obtained in step SP40 against the file names obtained in step SP53 and extracts the file names of all the files of importance level "C" which have not been sorted to any of the file groups (SP54).

The second file migration processing program 92 then sorts each above-extracted file of importance level "C" to any of the file groups for convenience of the system (for example, to equalize the used space of each RAID group 52), and registers necessary information about each file of importance level "C" in the corresponding file group management table 101 (FIG. 11) (SP55).

The second file migration processing program 92 then controls the RAID subsystem 8 and thereby migrates each file of importance level "C," which has been sorted to any of the file groups as described above, to the RAID group 52 associated with the file group to which the relevant file has been sorted (SP56).

Furthermore, the second file migration processing program 92 updates the corresponding importance level "A" file list, importance level "B" file list, and importance level "C" file list according to the levels of importance in order to add the file name of each file of importance level "A" extracted in step SP42, the file name of each file of importance level "B" extracted in step SP49, or the file name of each file of importance level "C" extracted in step SP53 so that they can be used for the first or second file migration processing to be executed in the future (SP57). Then, the second file migration processing program 92 terminates this second file migration processing.

(2-5-4) Power-Saving Control Processing

Figure 39:
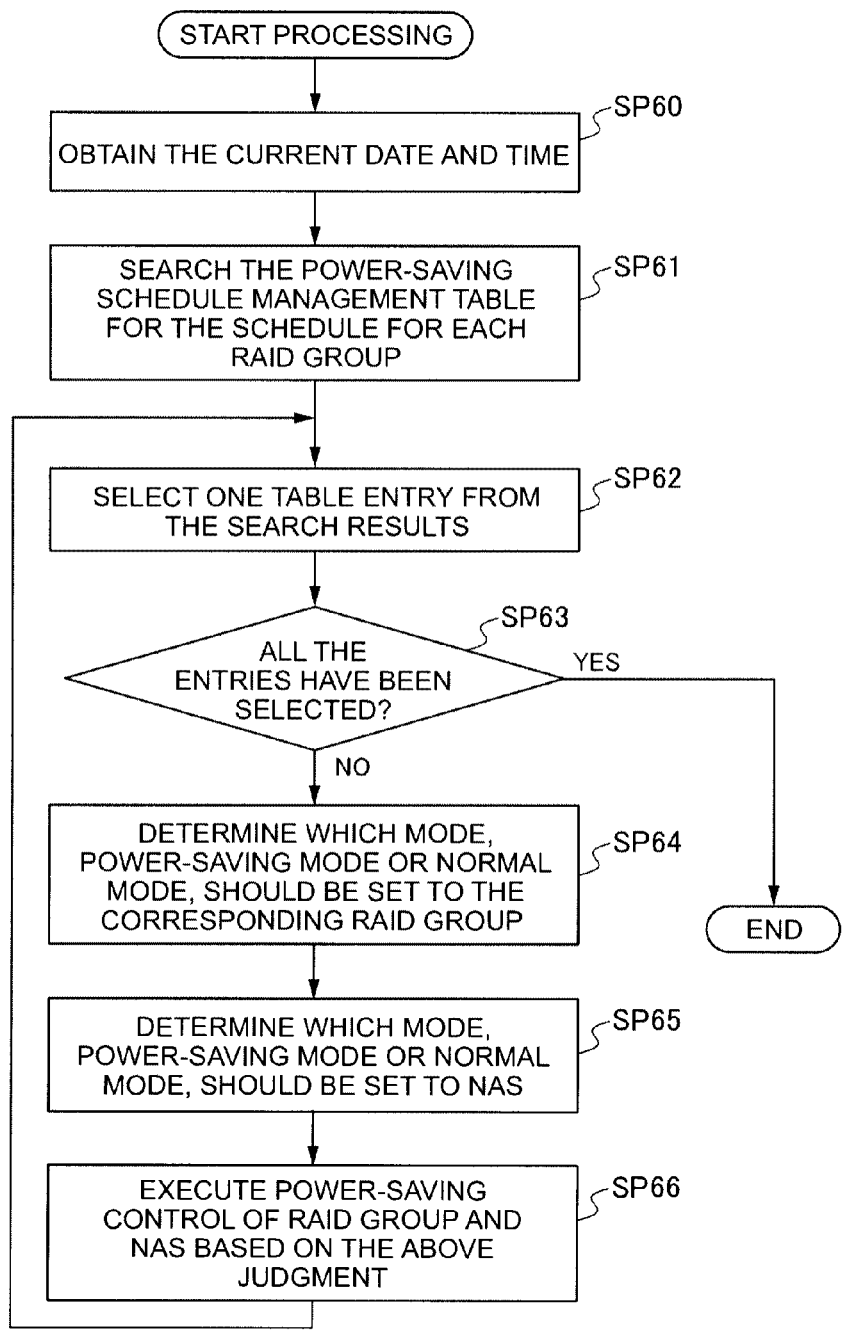
FIG. 39 is a flowchart illustrating a processing sequence for power-saving control processing.

FIG. 39 shows a processing sequence for power-saving control processing to be periodically executed by the power-saving control program 93 (FIG. 2) stored in the memory 41 for the management server 5 (FIG. 1) (hereinafter referred to as the "power-saving control processing"). The power-saving control program 93 executes the power-saving control processing in the processing steps shown in FIG. 39 according to the power-saving schedule defined by the power-saving schedule management table 102 (FIG. 12).

Specifically speaking, once the power-saving control program 93 starts this power-saving control processing, it first obtains the current date and time from an internal timer (not shown) (SP60) and then searches the power-saving schedule management table 102 for the power-saving schedule for each RAID group 52 (each file group) (SP61).

Next, the power-saving control program 93 selects one entry (line) from the power-saving schedule management table 102 (SP62) and then judges whether all the entries in the power-saving schedule management table 102 have been selected or not (SP63).

If a negative judgment is returned in this step, the power-saving control program 93 checks the current date and time obtained in step SP60 against the power-saving schedule defined for the entry selected in step SP62 and then determines which mode, the normal mode (the operating mode in which each of the disk units 50 constituting that RAID group 52 operates normally) or the power-saving mode (the operating mode in which each of the disk units 50 constituting that RAID group 52 is made to spin down), should be set to the corresponding RAID group 52 (SP64).

Subsequently, the power-saving control program 93 checks the current date and time obtained in step SP60 against the power-saving schedule defined for the entry selected in step SP62 and then determines which mode, the normal mode (the operating mode in which the clock frequency of the CPU 30 is a normal frequency) or the power-saving mode (the operating mode in which the clock frequency of the CPU 30 is clocked down), should be set to the NAS server 4 which manages the corresponding RAID group 52 (SP65).

The power-saving control program 93 switches the operating mode of the corresponding RAID group 52 and the corresponding NAS server 4 to either the normal mode or the power-saving mode as needed based on the judgment results in steps SP64 and SP65 (SP66). Furthermore, the power-saving control program 90 returns to step SP62 and then repeats processing from step SP62 to step SP66 while sequentially switching from one entry to another to be selected in step SP62.

If an affirmative judgment is returned in step SP63 by finishing executing the same processing for all the entries of the power-saving schedule management table 102, the power-saving control program 93 terminates the power-saving control processing.

(3) Advantageous Effects of this Embodiment

With the computer system according to this embodiment, a power-saving control schedule for each of the file groups and each of the RAID groups 52 associated with the file groups is set based on the user access pattern for files whose level of importance is "A" as described above. Therefore, the RAID group 52 which stores the files of importance level "A" can be operated always in the normal mode during the time zones when the users tend to access those files. As a result, it is possible to prevent decrease in the speed of accessing files of importance level "A" and achieve power-saving.

(4) Other Embodiments

The above embodiment has described the case where there are three levels of importance "A" to "C." However, the number of levels of importance is not limited to the above example, and there may be two or four or more levels of importance.

Moreover, the embodiment has described the case where the GNS server 3 is used to unify a plurality of NAS servers 4. However, the configuration of the present invention is not limited to the above-described configuration and, for example, the file system program 61 for the NAS server 4 (FIG. 2) may be used to unify the file systems located in a plurality of different RAID groups 52.

Specifically speaking, the file management table 84 (FIG. 8) managed by the GNS server 3 in the aforementioned embodiment may be managed by the file system program 61 for one NAS server 4. After receiving an I/O request on a file basis from the client/host 2, the file system program 61 may refer to the file management table 84, specify the file system which actually stores the relevant file, and execute access processing. The present invention may be applied to this configuration, and advantageous effects similar to those of the embodiment described earlier can be obtained. Incidentally, since only the NAS server 4 serves as the host, the "host name" field 84B (FIG. 8) for the file management table 84 may be omitted. However, if this "host name" field 84B is left, it can be used when converting the hierarchical file system into a GNS, the file management table 84 can be shared, and it is possible to save the trouble of migration.

The aforementioned embodiment has described the case where a file of importance level "B" is sorted to a file group to which a power-saving schedule closest to the user access pattern for that file is set. However, the invention is not limited to this example, the file of importance level "B" may be sorted to any of the file groups for convenience of the system just like in the case of the file of importance level "C."

Furthermore, the aforementioned embodiment has described the case where a file of importance level "C" is sorted from the viewpoint of the remaining capacity or load distribution of the file systems. However, the invention is not limited to this example, and the file of importance level "C" may be sorted to any of the file systems for convenience of other elements of the system.

The present invention can be used for computer systems with a wide variety of configurations.

What is claimed is:

1. A power-saving control apparatus for executing power-saving control of a storage apparatus, the power-saving control apparatus comprising:
    a first file migration processing unit configured to:
        obtain access logs for a plurality of files, which includes a plurality of first files having highest level of importance and a plurality of second files having lower level of importance than the highest level, stored in the storage apparatus;
        detect, for each of the files, a user access pattern in each of a plurality of time zones, the user access pattern indicating whether each of the files has been accessed in each of the time zones, based on the obtained access logs;
        create a group by grouping one or more first files having similar user access patterns based on the detected user access patterns of the respective first files in each of the time zones;
        allocate one or more second files to the group based on user access patterns of the one or more first files in each of the time zones and the plurality of second files;
        migrate the group, which includes the one or more first files and the one or more second files, to a different memory medium; and
        set a power-saving control schedule for the group, which includes the one or more first files and the one or more second files, and for each of the time zones based on the user access patterns of the one or more grouped first files in the group and not based on the user access patterns of the one or more second files in the group; and
    a power-saving control processing unit configured to execute power-saving control for each medium and for each of the time zones in accordance with the schedule set for the group and for each of the time zones.

2. The power-saving control apparatus according to claim 1, wherein the first file migration processing unit is configured to sort a file of the plurality of second files to which the power-saving control schedule similar to the user access pattern for that file is set.

3. The power-saving control apparatus according to claim 1, wherein the first file migration processing unit is configured to determine the group to which the file of the plurality of the second files is to be sorted, based on a free space of a file system belonging to the memory medium or operating time of the memory medium.

4. The power-saving control apparatus according to claim 1, wherein the memory media are disk units that constitute a RAID (Redundant Arrays of Independent Disks) group.

5. The power-saving control apparatus according to claim 1, further comprising:
    a second file migration processing unit configured to execute second file migration processing for obtaining an access log for a new file stored in the storage apparatus, detecting a user access pattern for the new file based on the obtained access log, and sorting the new file to the group to which the power-saving control schedule is set, based on the detected user access pattern for the new file; and a migration method selection processing unit configured to select either the first file migration processing or the second file migration processing to be executed at regular time intervals and having the first file migration processing unit or the second file migration processing unit execute the first file migration processing or the second file migration processing based on the selected result.

6. The power-saving control apparatus according to claim 5, wherein the migration method selection processing unit is configured to select the first file migration processing if there is no group, or if the group cannot be added, or if a certain amount of time has elapsed since the execution of the first file migration processing.

7. The power-saving control apparatus according to claim 1, wherein the memory media are respectively assigned to different NAS (Network Attached Storage) servers; and the power-saving control processing unit also configured to execute power-saving control of the NAS servers in addition to the power-saving control of each of the memory media.

8. A power-saving control method for executing power-saving control of a storage apparatus, the method comprising:

a first step of executing first file migration processing for obtaining access logs for a plurality of files, which includes a plurality of first files having highest level of importance and a plurality of second files having lower level of importance than the highest level, stored in the storage apparatus, detecting, for each of the files, a user access pattern in each of a plurality of time zones, the user access pattern indicating whether each of the files has been accessed in each of the time zones, based on the obtained access logs, creating a group by grouping one or more first files having similar user access patterns based on the detected user access patterns of the respective first files in each of the time zones, allocating one or more second files to the group based on user access patterns of the one or more first files in each of the time zones and the plurality of second files, migrating the group, which includes the one or more first files and the one or more second files, to a different memory medium, and setting a power-saving control schedule for the group, which includes the one or more first files and the one or more second files, and for each of the time zones based on the user access patterns of the one or more grouped first files in the group and not based on the user access patterns of the one or more second files in the group; and a second step of executing power-saving control for each medium and for each of the time zones in accordance with the schedule set for the group and for each of the time zones.

9. The power-saving control method according to claim 8, wherein in the first step, one of the files of the plurality of second files is sorted to the group to which the power-saving control schedule similar to the user access pattern for that file is set.

10. The power-saving control method according to claim 8, wherein in the first step, the group to which the file of the plurality of the second files is to be sorted is determined based on a free space of a file system belonging to the memory medium or operating time of the memory medium.

11. The power-saving control method according to claim 8, wherein the memory media are disk units that constitute a RAID (Redundant Arrays of Independent Disks) group.

12. The power-saving control method according to claim 8, further comprising:

a third step of selecting either the first file migration processing or second file migration processing to be executed at regular time intervals, the second file migration processing for obtaining an access log for a new file stored in the storage apparatus, detecting a user access pattern for the new file based on the obtained access log, sorting the new file to the group to which the power-saving control schedule is set, based on the detected user access pattern for the new file; and executing the first file migration processing or the second file migration processing based on the selected result.

13. The power-saving control method according to claim 12, wherein in the third step, the first file migration processing is selected if there is no group, or if the group cannot be added, or if a certain amount of time has elapsed since the execution of the first file migration processing.

14. The power-saving control method according to claim 8, wherein the memory media are respectively assigned to different NAS (Network Attached Storage) servers; and wherein in the second step, power-saving control of the NAS servers is also executed in addition to the power-saving control of each of the memory media.

\* \* \* \* \*